United States Patent
Rusanovskyy et al.

(10) Patent No.: US 11,956,475 B2
(45) Date of Patent: Apr. 9, 2024

(54) HARMONIZATION OF PREDICTION-DOMAIN FILTERS WITH INTERPOLATION FILTERING

(71) Applicant: QUALCOMM Incorporated, San Diego, CA (US)

(72) Inventors: Dmytro Rusanovskyy, San Diego, CA (US); Vadim Seregin, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 16/783,015

(22) Filed: Feb. 5, 2020

(65) Prior Publication Data
US 2020/0252653 A1    Aug. 6, 2020

Related U.S. Application Data

(60) Provisional application No. 62/802,067, filed on Feb. 6, 2019.

(51) Int. Cl.
*H04N 19/156* (2014.01)
*H04N 19/82* (2014.01)

(52) U.S. Cl.
CPC .................... *H04N 19/82* (2014.11)

(58) Field of Classification Search
CPC .. H04N 19/117; H04N 19/124; H04N 19/136; H04N 19/147; H04N 19/19;
(Continued)

(56) References Cited

U.S. PATENT DOCUMENTS

2013/0028327 A1*  1/2013  Narroschke ............ H04N 19/48
                                                               375/240.16
2013/0142262 A1*  6/2013  Ye ........................ H04N 19/196
                                                               375/240.16
(Continued)

FOREIGN PATENT DOCUMENTS

WO    WO-2018180841 A1 *  10/2018

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

(Continued)

*Primary Examiner* — Patrick E Demosky
(74) *Attorney, Agent, or Firm* — Shumaker & Sieffert, P.A.

(57) ABSTRACT

A device and method for coding video data is described. The device may generate filtered samples by performing, in a predicted samples domain, interpolation filtering and a second filtering from a group of one or more of: an adaptive filter, a domain transform filter, a scaler, or a local illumination compensation (LIC). The device may generate one or more of: residual data based on the filtered samples, or reconstructed samples based on the filtered samples; and code the video data based on one or more of the residual data or the reconstructed samples.

27 Claims, 27 Drawing Sheets

(58) Field of Classification Search
CPC ...... H04N 19/439; H04N 19/44; H04N 19/46; H04N 19/48; H04N 19/61; H04N 19/615; H04N 16/635; H04N 16/69; H04N 19/80; H04N 19/82; H04N 19/86

See application file for complete search history.

(56) References Cited

U.S. PATENT DOCUMENTS

| | | | |
|---|---|---|---|
| 2017/0223352 A1* | 8/2017 | Kim | H04N 19/157 |
| 2018/0184126 A1* | 6/2018 | Zhang | H04N 19/157 |
| 2020/0260119 A1* | 8/2020 | Esenlik | H04N 19/70 |
| 2020/0267392 A1* | 8/2020 | Lu | H04N 19/174 |

OTHER PUBLICATIONS

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Chen J., et al., "Algorithm Description of Joint Exploration Test Model 1," 1, JVET Meeting; Oct. 19, 2015-Oct. 21, 2015; Geneva, CH (The Joint Video Exploration Team of ISO/IEC JTC1/SC29/WG11 and ITU-T SG.16 ); URL: http://phenix.int-evry.fr/jvet/ , No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)Of ITU-T SG 16 WP 3 and ISO/IEC JTC 1/SC 29/WG 11, 7th Meeting, Jul. 13, 2017-Jul. 21, 2017, Torino, IT, Aug. 19, 2017 (Aug. 19, 2017), 51 Pages, XP030150980, p. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Ergen S., "ZigBee/IEEE 802.15.4 Summary", Sep. 10, 2004, 37 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Ikonin (Huawei) S., et al., "CE14: Hadamard Transform Domain Filter (Test 3)", 12. JVET Meeting; Oct. 3, 2018-Oct. 12, 2018; Macao, CN; (The Joint Video Exploration Team of ISO/IEC JTC1/SC29/WG11 and ITU-T SG.16) No. JVET-L0326-v4, Oct. 7, 2018 (Oct. 7, 2018), XP030195212, 14 Pages, Retrieved from the Internet: URL:http://phenix.int-evry.fr/jvet/doc_end_user/documents/12_Macao/wg11/JVET-L0326-v4.zip, JVET-L326-v3.docx [retrieved on Oct. 7, 2018].

"Information technology—Dynamic Adaptive Streaming over http {Dash}—Part 1: Media Presentation Description and Segment Formats," ISO/IEC 23009-1, International Standard, Draft third edition, Jan. 9, 2017, 216 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving video, Advanced video coding for generic audiovisual services, Mar. 31, 2010, p. 674, URL:https://www.itu.int/rec/dologin_pub.asp?lang=e&id=T-RECH.264-201003-S !! PDF-E&type=items.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lu T., et al., "CE12-related: Universal Low Complexity Reshaper for SDR and HDR video", Joint Video Experts Team (JVET) of ITU-T SG 16 WP 3 and ISO/IEC JTC 1/SC 29/WG 11, JVET-L0247-v2, 12th Meeting: Macao, CN, Oct. 3-12, 2018, pp. 1-10.

Ohm J-R., et al., "MPEG-4 Advanced Video Coding", MPEG Doc#: N7314, Jul. 2005, 11 Pages.

Pu F., et al., "CE12-4: SDR In-loop Reshaping", Joint Video Experts Team (JVET) of ITU-T SG 16 WP 3 and ISO/IEC JTC 1/SC 29/WG 11, JVET-L0246-v2, 12th Meeting: Macao, CN, Oct. 3-12, 2018, pp. 1-9.

Rasch J., et al., "CE10: Uniform Directional Diffusion Filters For Video Coding," Joint Video Experts Team (JVET) of ITU-T SG 16 WP 3 and ISO/IEC JTC 1/SC 29/WG 11, JVET-M0042-v3, 13th Meeting: Marrakech, MA, Jan. 9-18, 2019, Document: JVET-M0042-r1, pp. 1-8.

Seregin V., et al., "CE10-Related: Unidirectional Illumination Compensation", Joint Video Experts Team (JVET) of ITU-T SG 16 WP 3 and ISO/IEC JTC 1/SC 29/WG 11, JVET-M0500-v3, 13th Meeting, Jan. 9-18, 2019, 4 pages.

* cited by examiner

FIG. 3

HARMONIZATION OF PREDICTION-DOMAIN FILTERS WITH INTERPOLATION FILTERING

This application claims the benefit of U.S. Provisional Patent Application No. 62/802,067, filed Feb. 6, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding. The techniques of this disclosure may improve performance and reduce complexity of inter prediction by harmonizing and/or combining stages of diffusion, bilateral or transform domain filter with interpolation filtering utilized in motion compensated prediction in a video coder. For example, uniform directional diffusion filters, bilateral filters, Hadamard transform domain filters, reshapers and/or local illumination compensation may be combined with interpolation filters and be applied in the predicted samples domain to reduce computation and implementation complexity.

In some examples, a method includes generating filtered samples by applying, in a predicted samples domain, an interpolation filter and a second filter from a group of one or more of: an adaptive filter, a transform domain filter, a scaler, or a local illumination compensation (LIC); generating one or more of: residual data based on the filtered samples, or reconstructed samples based on the filtered samples; and coding the video data based on one or more of the residual data or the reconstructed samples.

In some examples, a device includes a memory configured to store video data and one or more processors implemented in circuitry and communicatively coupled to the memory, the one or more processors configured to: generate filtered samples by performing, in a predicted samples domain, interpolation filtering and a second filtering from a group of one or more of: an adaptive filter, a transform domain filter, a scaler, or a LIC; generate one or more of: residual data based on the filtered samples, or reconstructed samples based on the filtered samples; and code the video data based on one or more of the residual data or the reconstructed samples.

In some examples, a method includes deriving, based on reshaped samples, parameters for a current block of the video data, the reshaped samples including one or more of: reshaped reconstructed neighbor samples of the current block, reshaped neighbor samples of a reference block, or reshaped samples of the reference block; generating a first predicted signal for the current block; using the parameters to generate a second predicted signal by applying a filter to the first predicted signal; generating one or more of: residual data based on the second predicted signal, or reconstructed samples of the current block based on the second predicted signal; and coding the video data based on one or more of the generated residual data or the reconstructed samples.

In some examples, a device includes a memory configured to store video data and one or more processors implemented in circuitry and communicatively coupled to the memory, the one or more processors configured to: derive, based on reshaped samples, parameters for a current block of the video data, the reshaped samples including one or more of: reshaped reconstructed neighbor samples of the current block, reshaped neighbor samples of a reference block, or reshaped samples of the reference block; generate a first predicted signal for the current block; use the parameters to generate a second predicted signal by applying a filter to the first predicted signal; perform one or more of: generate residual data based on the second predicted signal, or reconstruct samples of the current block based on the second predicted signal; and code the video data based on one or more of the residual data or the reconstructed samples.

In some examples, a device includes means for generating filtered samples by applying, in a predicted samples domain, an interpolation filter and a second filter from a group of one or more of: an adaptive filter, a transform domain filter, a scaler, or a LIC; means for generating one or more of: residual data based on the filtered samples, or reconstructed samples based on the filtered samples; and means for coding the video data based on one or more of the residual data or the reconstructed samples.

In some examples a non-transitory computer-readable medium is encoded with instructions that, when executed, cause one or more processors to generate filtered samples by applying, in a predicted samples domain, an interpolation filter and a second filter from a group of one or more of: an adaptive filter, a transform domain filter, a scaler, or a LIC; generate one or more of: residual data based on the filtered samples, or reconstructed samples based on the filtered samples; and code the video data based on one or more of the residual data or the reconstructed samples.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating example integer-pixel samples from a reference frame that are used to interpolate fractional pixel samples.

DETAILED DESCRIPTION

Several sample-level in-loop filtering methods have been proposed to improve video coding performance. Some of these methods, such as Uniform Directional Diffusion Filters (UDDF) or local illumination compensation (LIC) are described as being implemented in the prediction samples domain, at the stage following the motion compensation. Other tools, such as bilateral filter (BIF) or Hadamard Domain Transform Filter (HTDF) may be implemented in the reconstruction samples domain, following the reconstruction stage. These processing modules have been proposed to be implemented as an additional stage to the existing interpolation filtering. For example, UDDF or LIC directly follow the interpolation filtering, whereas BIF and/or HTDF are separated from interpolation filtering by a linear operation of summation.

Cascading of filtering stages may be redundant and may be combined in a single processing stage. This disclosure discloses several methods that may potentially improve compression efficiency by harmonization and/or joint optimization of the interpolation filtering with other in-loop modules such as BIF, UDDF, HTDF, Reshaper and LIC. To further reduce computation and implementation complexity, some of these techniques may be combined with interpolation into a single processing stage and applied in the predicted samples domain, e.g., taking reference samples as well as reconstructed samples as input and deriving predicted samples as output.

Figure 1:
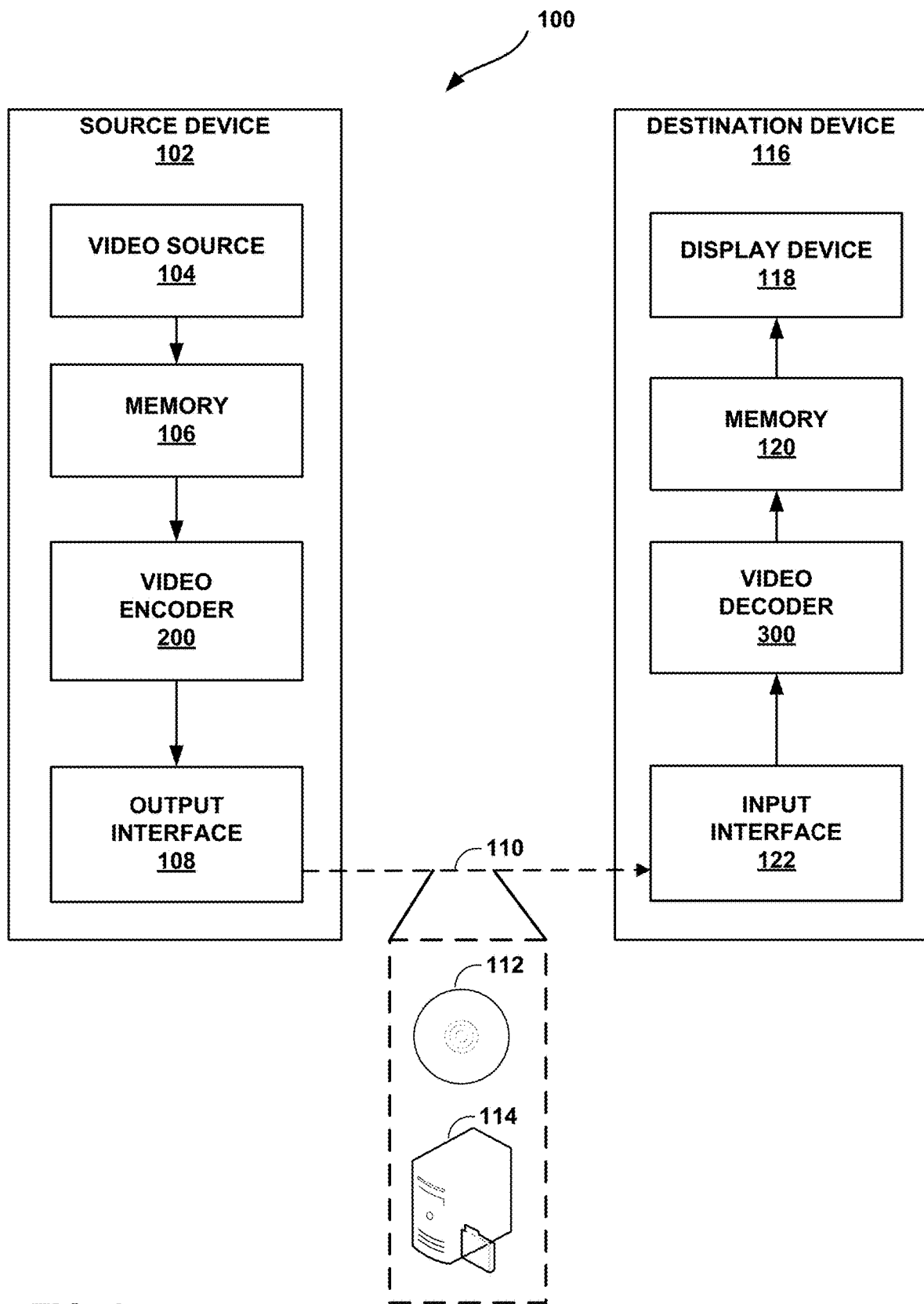
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming devices, head-mounted displays, virtual/augmented reality devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for harmonization and combining stages of diffusion filtering, bilateral filtering or transform domain filtering with interpolation filtering utilized in motion compensated prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for harmonization and combining stages of diffusion filtering, bilateral filtering or transform domain filtering with interpolation filtering utilized in motion compensated prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 or video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally, or alternatively, memories 106, 120 may store software instructions executable by, e.g., video encoder 200 or video decoder 300, respectively. Although shown separately from video encoder 200 or video decoder 300 in this example, it should be understood that video encoder 200 or video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 or video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 or video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 or video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 or video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 or video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 3)," Joint Video Experts Team (WET) of ITU-T SG 16 WP 3 and ISO/IEC JTC 1/SC 29/WG 11, 12$^{th}$ Meeting: Macao, CN, 3-12 Oct. 2018, JVET-L1001-v9 (hereinafter "VVC Draft 3). The techniques of this disclosure, however, are not limited to any particular coding standard.

In general, video encoder 200 or video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 or video decoder 300 may code video data represented in a YUV (e.g., Y, Cb, Cr) format. That is, rather than coding red, green, and blue (RGB) data for samples of a picture, video encoder 200 or video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 or video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 or video decoder 300 may use a single QTBT or MTT structure to represent each of the luminance and chrominance components, while in other examples, video encoder 200 or video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 or video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Video compression technologies perform spatial and temporal prediction to reduce or remove the redundancy inherent in input video signals. In order to reduce temporal redundancy (that is, similarities between video signals in neighboring frames), motion estimation is carried out to track the movement of video objects. Motion estimation may be done on blocks of variable sizes. The object displacement as the outcome of motion estimation is commonly known as motion vectors. Motion vectors may have half-, quarter-pixel, $1/16^{th}$-pixel precisions (or any finer precisions); this allows the video coder to track motion field in higher precision than integer-pixel locations and hence obtain a better prediction block. When motion vectors with fractional pixel values are used, interpolation operations are carried out.

Figure 2:
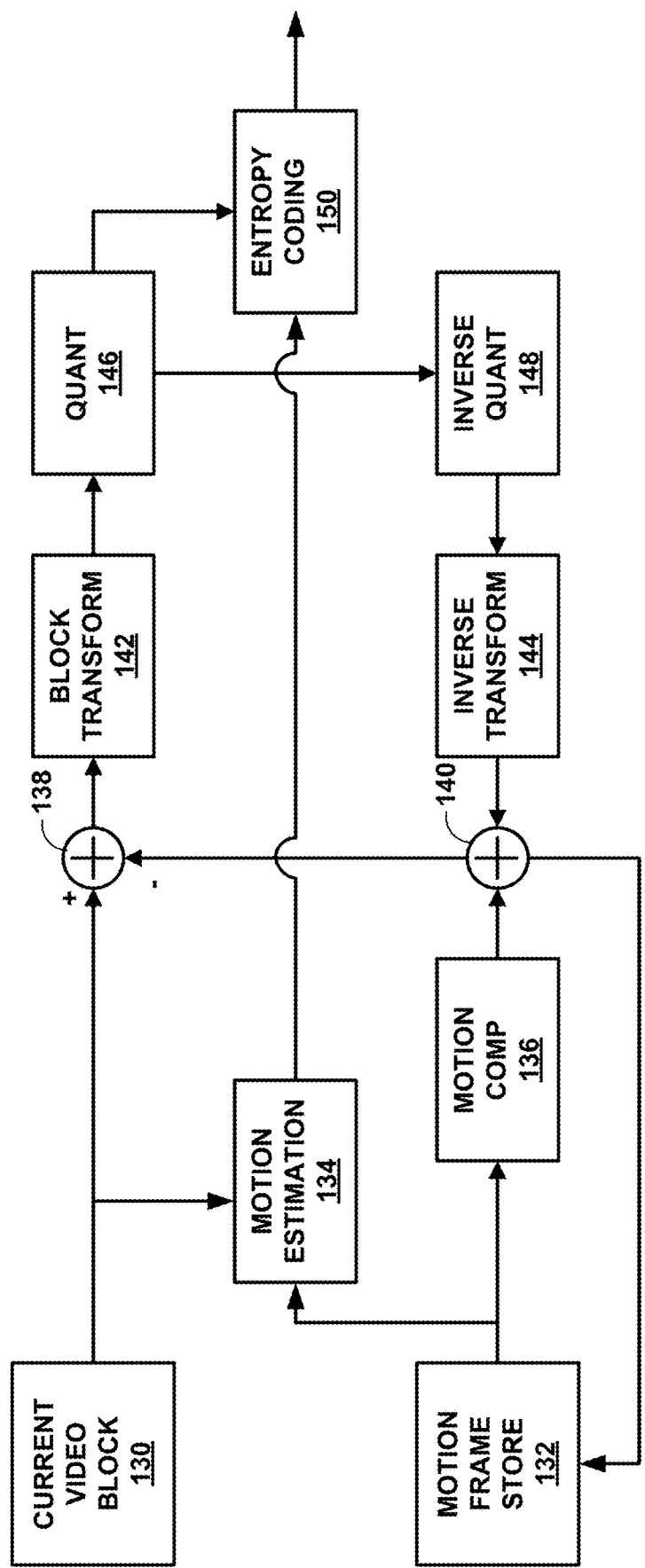
FIG. 2 is a block diagram illustrating a video encoder that uses block-based motion estimation to reduce temporal redundancy.

After motion estimation, the best motion vector may be decided using a certain rate-distortion model. Then, the prediction video block is formed by motion compensation using the best motion vector. The residual video block is formed by subtracting the prediction video block from the original video block. A transform is then applied on the residual block. The transform coefficients are then quantized and may be entropy coded to further reduce bit rate. FIG. 2 is a block diagram of an example video encoder that uses block-based motion estimation to reduce temporal redundancy. In some examples, video encoder 200 of FIG. 1 may perform the techniques of the video encoder of FIG. 2. Note that some video coding systems, such as video coding systems implementing the H.264/AVC or HEVC standard, also allow spatial prediction for intra coded blocks, which is not depicted in FIG. 2.

In the example of FIG. 2, a current video block 130 is provided to motion estimation unit 134 and residual generation unit 138. Residual generation unit 138 may generate a residual block by subtracting a prediction block from the current block. Block transform unit 142 may perform a transform operation on the residual block to generate transform coefficients. Quantization unit 146 may quantize the transform coefficients. Entropy coding unit 150 may entropy code the quantized transform coefficients and motion vectors from motion estimation unit 134 and output encoded quantized transform coefficients and motion vector information in a bitstream. Inverse quantization unit 148 may inverse quantize the quantized transform. Inverse transform unit 144 may inverse transform the transform coefficients to reconstruct the residual data. Motion frame store 132 may provide a reference frame to motion estimation unit 134 and motion compensation unit 136. Motion estimation unit 134 may generate motion vectors based on the reference frame. Motion compensation unit 136 may perform motion compensation. Reconstruction unit 140 may reconstruct a block of video data.

Figure 3:
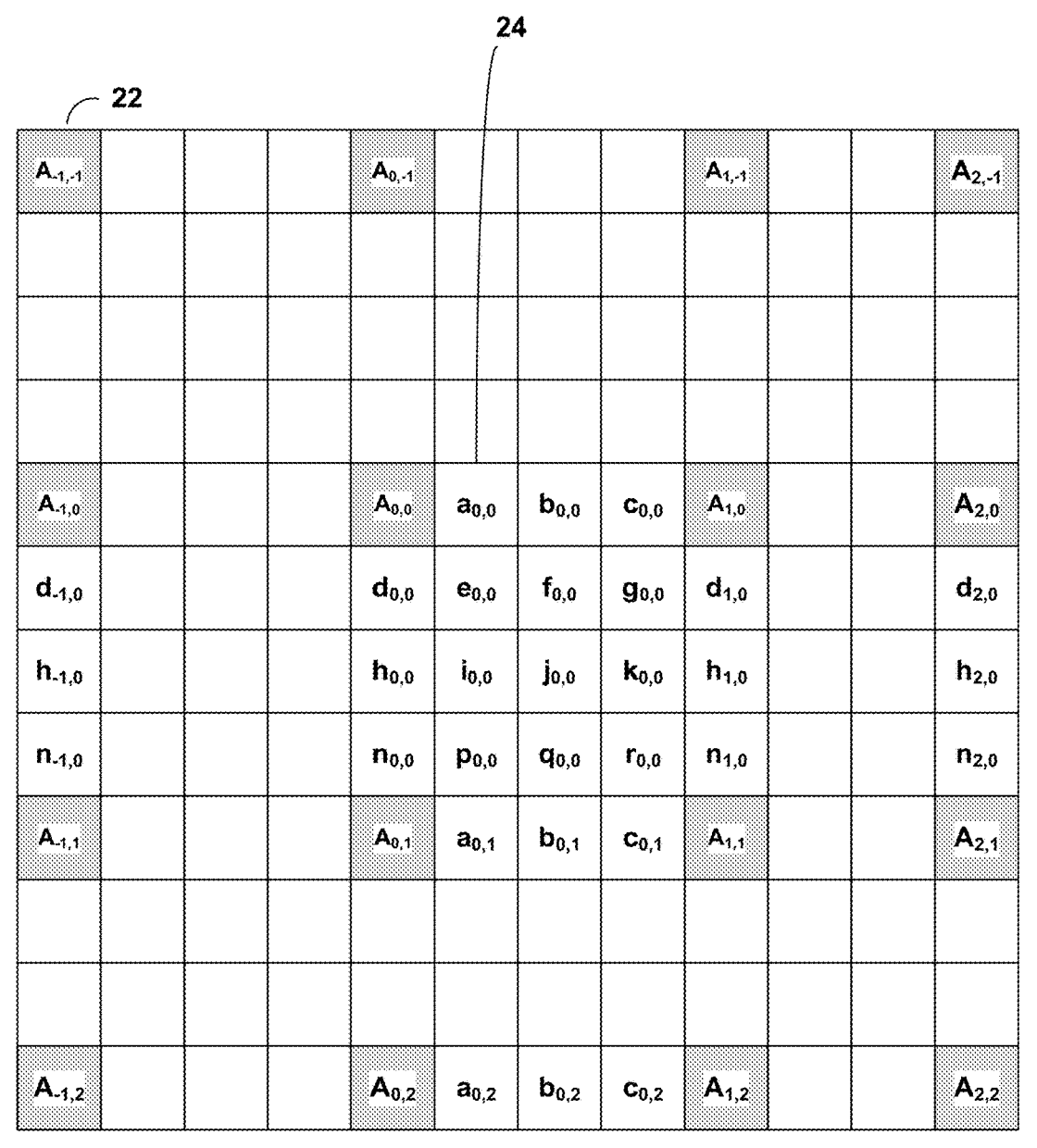

FIG. 3 is a conceptual diagram illustrating example integer-pixel samples from a reference frame that may be used to interpolate fractional pixel samples. Using ¼-pixel precision as an example, FIG. 3 shows the integer-pixel samples (also called full-pixel, shown in shaded blocks with upper-case letters), for example, integer-pixel sample 22, from a reference frame that may be used to interpolate a fractional pixel (also called sub-pixel, shown in un-shaded blocks with lower-case letters) samples. There are altogether 15 sub-pixel positions, labeled "$a_{0,0}$" through "$r_{0,0}$" in FIG. 3, for example, sub-pixel position 24. In HEVC, the samples labelled $a_{0,0}$, $b_{0,0}$, $c_{0,0}$, $d_{0,0}$, $h_{0,0}$, and $n_{0,0}$ are derived by applying an 8-tap filter to the nearest integer position samples. Then, the samples labelled $e_{0,0}$, $i_{0,0}$, $p_{0,0}$, $f_{0,0}$, $j_{0,0}$, $q_{0,0}$, $g_{0,0}$, $k_{0,0}$, and $r_{0,0}$ are derived by applying an 8-tap filter to the samples $a_{0,i}$, $b_{0,i}$ and $c_{0,i}$ with i=−3 . . . 4 in the vertical direction. The 8-tap filter to be applied is shown below in Table 1.

TABLE 1

HEVC 8-tap luma interpolation filter for quarter-pel mv accuracy

| Phase shift | Coefficients |
| --- | --- |
| 0 | {0, 0, 0, 64, 0, 0, 0, 0}, |
| 1 | {−1, 4, −10, 58, 17, −5, 1, 0}, |
| 2 | {−1, 4, −11, 40, 40, −11, 4, −1}, |
| 3 | {0, 1, −5, 17, 58, −10, 4, −1}, |

In JEM, a next generation video codec, $1/16^{th}$-mv (motion vector) resolution is enabled. Thus, filters with 16 different phases are being used for interpolation, as shown below in Table 2. However, a fixed set of 8-tap filters is still utilized for interpolation.

TABLE 2

8-tap luma interpolation filter for 1/16-pel mv accuracy in JEM

| Phase shift | Coefficients |
| --- | --- |
| 0 | {0, 0, 0, 64, 0, 0, 0, 0}, |
| 1 | {0, 1, −3, 63, 4, −2, 1, 0}, |
| 2 | {−1, 2, −5, 62, 8, −3, 1, 0}, |
| 3 | {−1, 3, −8, 60, 13, −4, 1, 0}, |
| 4 | {−1, 4, −10, 58, 17, −5, 1, 0}, |
| 5 | {−1, 4, −11, 52, 26, −8, 3, −1}, |
| 6 | {−1, 3, −9, 47, 31, −10, 4, −1}, |
| 7 | {−1, 4, −11, 45, 34, −10, 4, −1}, |
| 8 | {−1, 4, −11, 40, 40, −11, 4, −1}, |
| 9 | {−1, 4, −10, 34, 45, −11, 4, −1}, |
| 10 | {−1, 4, −10, 31, 47, −9, 3, −1}, |
| 11 | {−1, 3, −8, 26, 52, −11, 4, −1}, |
| 12 | {0, 1, −5, 17, 58, −10, 4, −1}, |
| 13 | {0, 1, −4, 13, 60, −8, 3, −1}, |
| 14 | {0, 1, −3, 8, 62, −5, 2, −1}, |
| 15 | {0, 1, −2, 4, 63, −3, 1, 0} |

When a syntax element is coded with CABAC, a context model is applied to represent the conditional probability. In HEVC, different syntax elements may utilize different context models. For example, video encoder 200 may choose one context model for a syntax element from several candidate context models, based on the coding context, such as the bin number or information of decoded neighboring blocks. For example, three candidate context models named skip_flag_C[0], skip_flag_C[1] and skip_flag_C[2] may be used to code the syntax element cu_skip_flag. To choose the appropriate context from the three candidate, video encoder 200 may calculate x as x=(cu_skip_flag[xNbL][yNbL]&& availableL)+(cu_skip_flag[xNbA][yNbA]&& availableA) The luma location (x0, y0) specifies the top-left luma sample of the current luma block relative to the top-left sample of the current picture.

The location (xNbL, yNbL) is set equal to (x0−1, y0) and the variable availableL is set to specify the availability of the block located directly to the left of the current block, e.g., the block directly to the left of the current block has already been coded.

The location (xNbA, yNbA) is set equal to (x0, y0−1) and the variable availableA is set to specify the availability of the coding block located directly above the current block.

cu_skip_flag[xNbL][yNbL] and cu_skip_flag[xNbA][yNbA] represent the cu_skip_flag of block L and block A.

Figure 4:
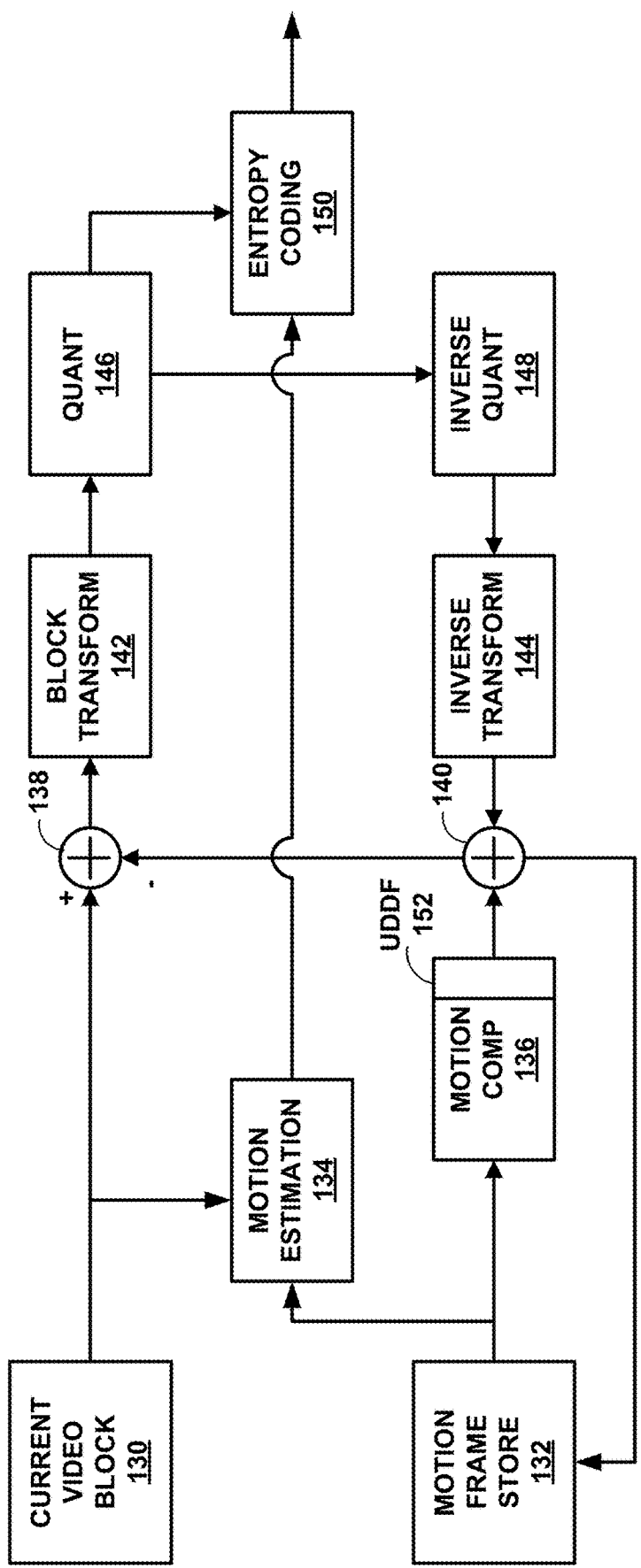
FIG. 4 is a block diagram that illustrates an example inter prediction chain of a hybrid video codec with Uniform Directional Diffusion Filters (UDDF) following the motion compensation stage.

One version of Uniform Directional Diffusion Filters (UDDF) was proposed and tested in the JVET contribution Rasch et al., "CE10: Uniform Directional Diffusion Filters for Video Coding," Joint Video Experts Team (JVET) of ITU-T SG 16 WP 3 and ISO/IEC JTC 1/SC 29/WG 11, 13th Meeting: Marrakech, MA, 9-18 Jan. 2019, document JVET-M0042 (hereinafter, "JVET-M0042"). JVET-M0042 indicated that UDDF is to be applied in the prediction domain as an additional stage following motion compensated prediction (also referred to herein as motion compensation). FIG. 4 is a block diagram that illustrates an example inter prediction chain of a hybrid video codec with UDDF following the motion compensation stage. A hybrid video codec is a video codec that uses inter and intra prediction and transforms on residuals. The elements of FIG. 4 function similarly to the elements of FIG. 2, described above, with the addition of UDDF 152 between motion compensation unit 136 and reconstruction unit 140. In some examples, video encoder 200 may perform the techniques of the hybrid video coder of FIG. 4.

UDDF is defined through two types of filters: a 2-dimensional (2D) filter with a size of 3×3 and a directional 1-dimensional (1D) filter with a size of 1×9.

For example, let pred be the prediction signal on a given block obtained by intra or motion compensated prediction. In order to handle boundary points for the UDDF filters, the prediction signal may be extended to a prediction signal $pred_{ext}$. This extended prediction is formed by adding one line of reconstructed samples left and above the block to the prediction signal and then the resulting signal is mirrored in all directions. The UDFF is realized by convolving the prediction signal with a fixed mask that is given as $h^I$, defined below. It is proposed to replace the prediction signal pred by $$h^I * \text{pred},$$

using the aforementioned boundary extension. Here, an example filter mask $h^I$ may be given as:

$$h^I = 0.125 \begin{pmatrix} 0 & 1 & 0 \\ 1 & 4 & 1 \\ 0 & 1 & 0 \end{pmatrix} \quad \text{Eq. (1)}$$

The directional filters may be defined separately for a horizontal filter $h^{hor}$ and a vertical filter $h^{ver}$, specified through a fixed mask. The filtering may be restricted to be either applied only along the vertical or along the horizontal direction. An example vertical filter may be realized by applying the fixed filter mask:

$$h_{ver} = (0.5)^4 \begin{pmatrix} 1 \\ 0 \\ 4 \\ 0 \\ 6 \\ 0 \\ 4 \\ 0 \\ 1 \end{pmatrix} \quad \text{Eq. (2)}$$

to the prediction signal and the horizontal filter may be realized by using the transposed mask $$h_{hor} = h_{ver}^t.$$

The extension of the prediction signal may be performed in the same way as discussed above.

Figure 5:
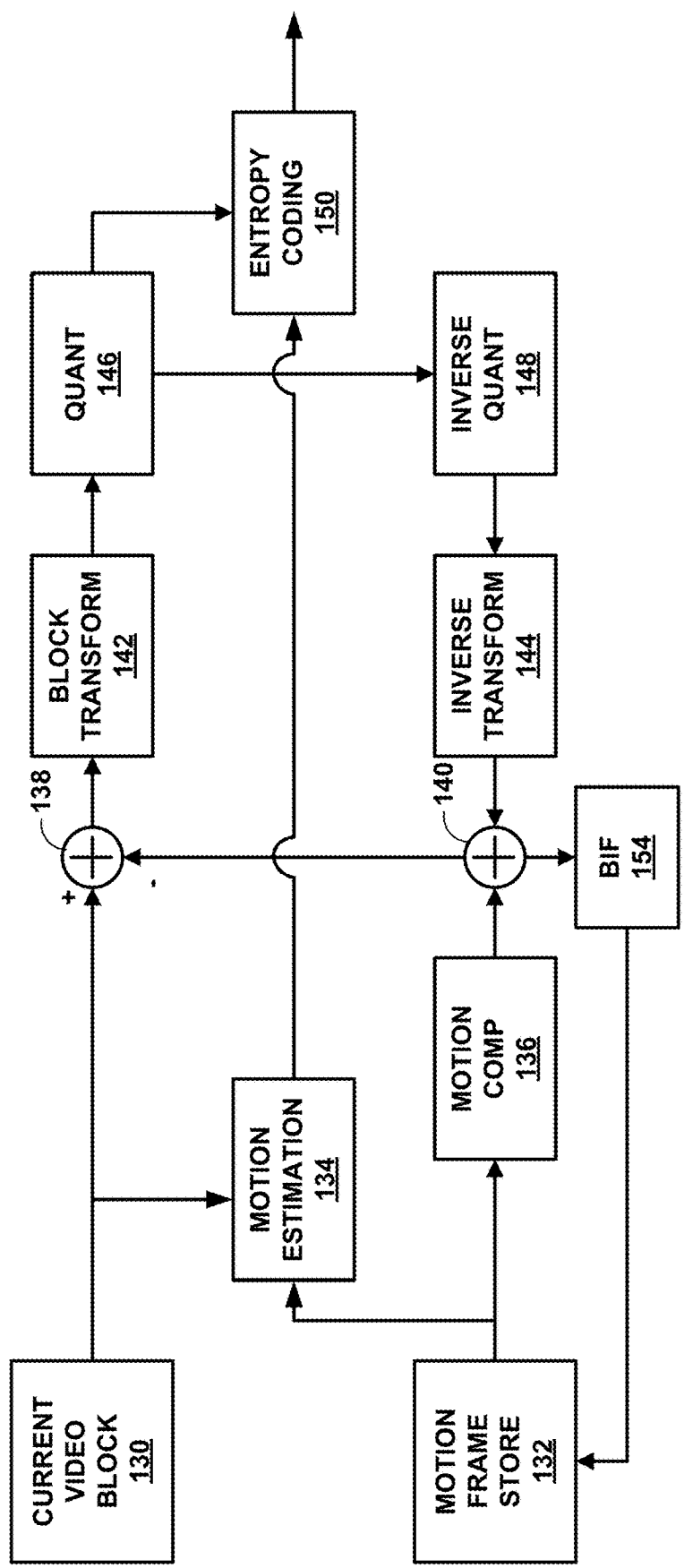
FIG. 5 is a block diagram illustrating an example inter prediction chain of a hybrid video codec with post reconstruction following the motion compensation stage.

Another approach to implement an in-loop filter is to apply the in-loop filter in the reconstruction samples domain (which may also be called the reconstructed samples domain), in the chain preceding sample adaptive offset (SAO), deblocking and adaptive loop filter (ALF). One version of such a filter—Bilateral Filter (BIF) was described and tested in JVET contribution Chen et al., "Description of SDR, HDR and 360° video coding technology proposal by Qualcomm and Technicolor—low and high complexity versions," Video Exploration Team (JVET) of ITU-T SG 16 WP 3 and ISO/IEC JTC 1/SC 29/WG 11, 10th Meeting: San Diego, US, 10-20 Apr. 2018, document JVET-J0021 (hereinafter, "JVET-J0021"). JVET-J0021 described that BIF may be applied in the reconstruction samples domain as an additional stage preceding loop filters, such as deblocking and ALF. FIG. 5 is a block diagram illustrating an example inter prediction chain of a hybrid video codec with post reconstruction following the motion compensation stage. The elements of FIG. 5 function similarly to the elements of FIG. 2 with the addition of BIF 154 between reconstruction unit 140 and motion frame store 132. In some examples, video encoder 200 may perform the techniques of the hybrid video codec of FIG. 5.

JVET-J0021 indicated that BIF may be applied to luma blocks with non-zero transform coefficients and slice quantization parameter(s) larger than 17. BIF, if applied, is performed on reconstructed samples right after the inverse transform. In other words, video encoder 200 or video decoder 300 may apply BIF 154 to reconstructed samples after video encoder 200 or video decoder 300 inverse transform video data. In addition, the filter parameters, e.g., weights, may be explicitly derived from the coded information. For example, video encoder 200 may signal filter parameters in a bitstream and video decoder 300 may determine the filter parameters by reading the signal in the bitstream.

Figure 6:
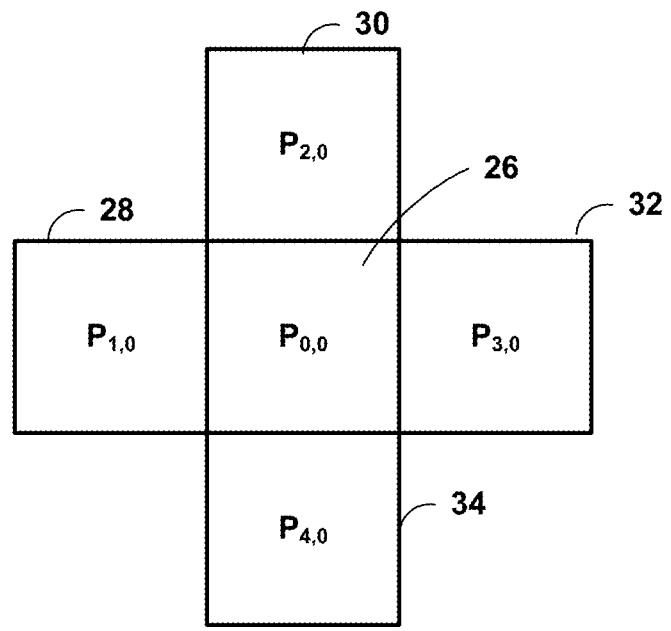
FIG. 6 is a block diagram illustrating example neighboring samples utilized in a bilateral filter.

The filtering process may be defined as:

$$P'_{0,0} = P_{0,0} + \Sigma_{k=1}^{k} W_k(\text{abs}(P_{k,0} - P_{0,0})) \times (P_{k,0} - P_{0,0}), \quad \text{Eq. (3)}$$

where $P_{0,0}$ is the intensity of the current sample and $P'_{0,0}$ is the modified intensity of the current sample, $P_{k,0}$ and $W_k$ are the intensity and weighting parameter for the k-th neighboring sample, respectively. FIG. 6 is a block diagram illustrating example of neighboring samples utilized in a BIF. An example of one current sample 26 ($P_{0,0}$) and its four neighboring samples 28, 30, 32 and 34 ($P_{1,0}$, $P_{2,0}$, $P_{3,0}$, and $P_{4,0}$) where K=4 is depicted in FIG. 6.

More specifically, the weight $W_k(x)$ associated with the k-th neighboring sample may be defined as follows:

$$W_k(x) = \text{Distance}_k \times \text{Range}_k(x) \quad (4)$$

wherein $$\text{Distance}_k = e^{\left(-\frac{10000}{2\sigma_d^2}\right)} / 1 + 4 * e^{\left(-\frac{10000}{2\sigma_d^2}\right)}, \quad (5)$$

$$\text{Range}_k(x) = e^{\left(-\frac{x^2}{8*(QP-17)*(QP-17)}\right)}$$

and $\sigma_d$ is dependent on the coded mode and coding block sizes and QP is a quantization parameter. The described filtering process is applied to intra-coded blocks, and inter-coded blocks when TU is further split, to enable parallel processing.

To better capture statistical properties of a video signal, and improve performance of the filter, the weights function resulting from Equation (4) may be adjusted by the $\sigma_d$ parameter, tabulated in a table that video encoder 200 may provide to video decoder 300 as side information, and may be dependent on coding mode and parameters of block partitioning (such as a minimal size).

Figure 7:
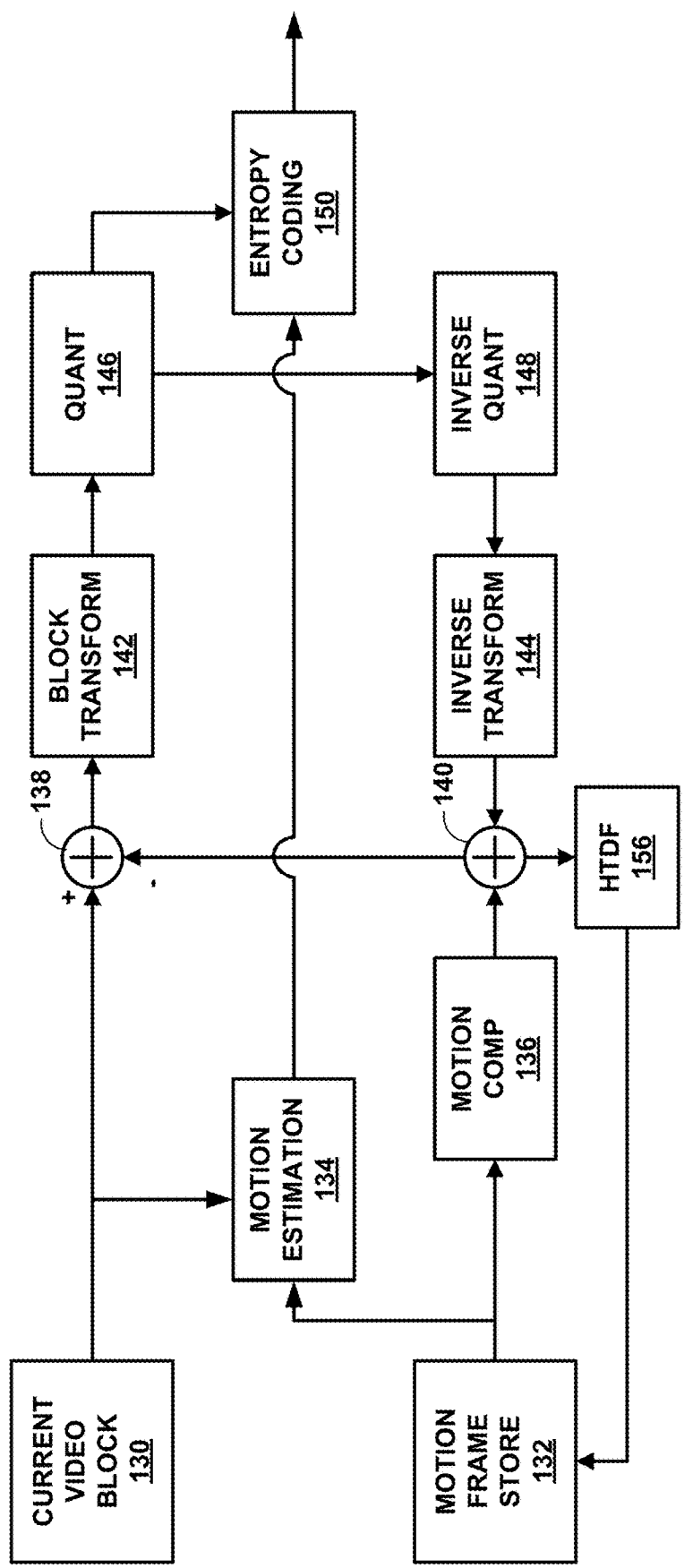
FIG. 7 is a block diagram illustrating an inter prediction chain of a hybrid video codec with post reconstruction following the motion compensation stage.

One version of such a filter—Hadamard transform domain filter (HTDF)—may be applied to luma reconstructed blocks right after block reconstruction, as shown in FIG. 7. HTDF was studied in JVET-K-CE14 (Ikonon et al., "CE14: Hadamard Transform Domain Filter (Test 3)", Video Experts Team (JVET) of ITU-T SG 16 WP 3 and ISO/IEC JTC 1/SC 29/WG 11, 12th Meeting: Macao, CN, 3-12 Oct. 2018, document JVET-L0326 (hereinafter, "JVET-L0326").

FIG. 7 is a block diagram illustrating an inter prediction chain of a hybrid video codec with post reconstruction following the motion compensation stage. The elements of FIG. 7 function similarly to the elements of FIG. 2 with HTDF 156 added between reconstruction unit 140 and motion frame store 132. In some examples, video encoder 200 may perform the techniques of the hybrid video codec of FIG. 7. For each pixel from the reconstructed block output by reconstruction unit 140, HTDF may perform the following steps: 1) scanning for 4 neighboring pixels around a processing pixel where the processing pixel is a current pixel and the current pixel is one of the 4 neighboring pixels (i.e., the 4 neighboring pixels include the current pixel) according to a scan pattern; 2) applying a 4-point Hadamard transform of the scanned pixels; and 3) spectrum filtering based on the following formula:

$$F(i, \sigma) = \frac{R(i)^2}{R(i)^2 + m*\sigma^2} * R(i)$$

wherein (i) is index of spectrum component in Hadamard spectrum, R(i) is spectrum component of reconstructed pixels corresponding to index, m=4 is normalization constant equal to number of spectrum components, σ is filtering parameter deriving from codec quantization parameter QP using following equation:

$$\sigma = 2.64 * 2^{(0.1269*(QP-11))} \quad \text{Eq. (6)}$$

The first spectrum component corresponding to DC value is bypassed without filtering; 4) inverse 4-point Hadamard transforming of filtered spectrum; 5) after filtering, placing the filtered pixels in their original positions in an accumulation buffer; 6) after completing filtering of pixels, normalizing the accumulated values by a number of processing groups used for each pixel filtering. Due to use of padding of one sample around the block, the number of processing groups is equal to 4 for each pixel in the block and normalization is performed by right shifting on 2 bits.

Figure 8:
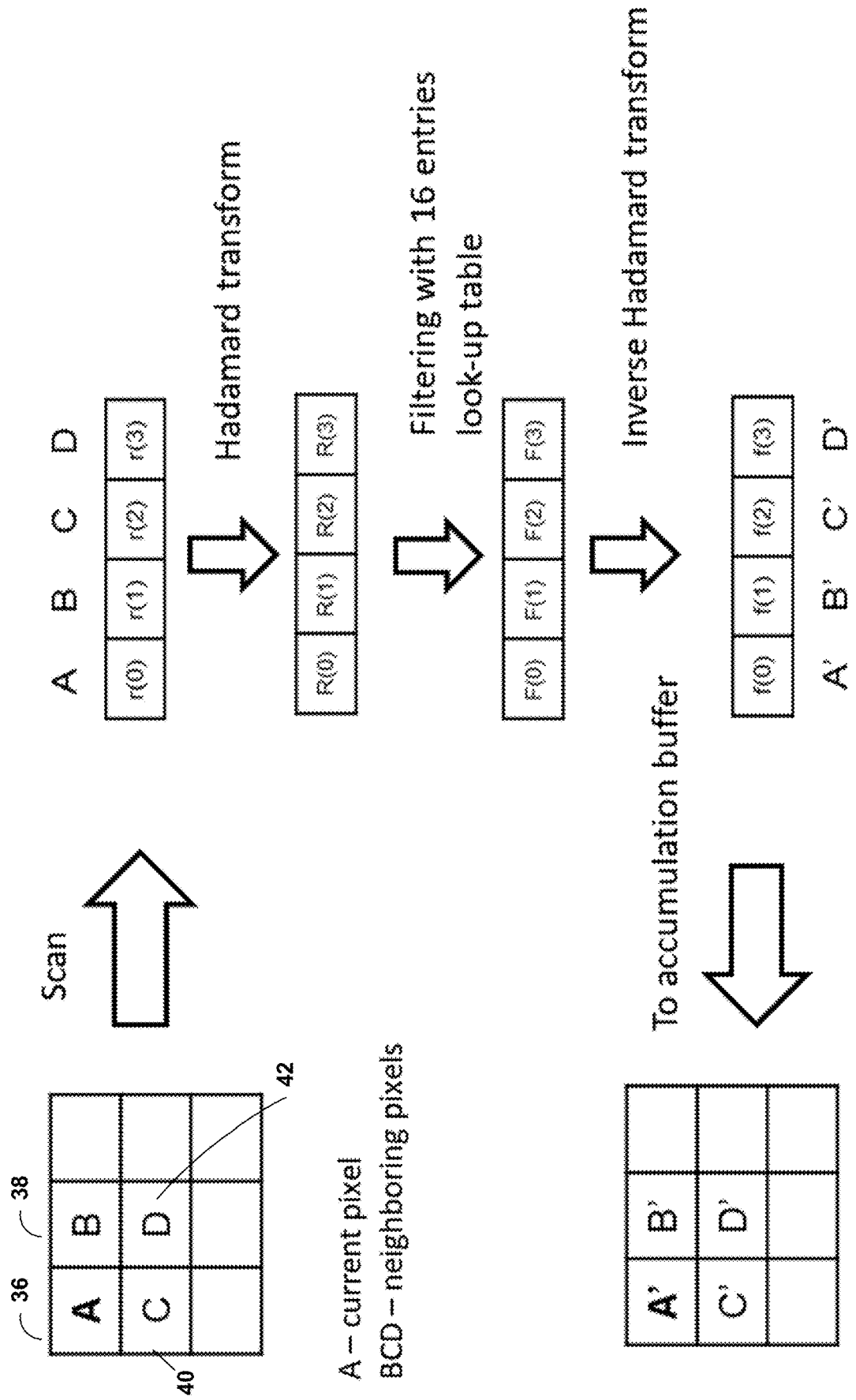
FIG. 8 is a conceptual diagram illustrating an example filtering process.

FIG. 8 is a conceptual diagram illustrating an example filtering process. The HTDF filtering process is schematically presented on FIG. 8. For example, A denotes a current pixel 36. B, C and D represent neighboring pixels 38, 40 and 42, respectively, of current pixel 36 (A, B, C and D all being neighbors). The hybrid video codec of FIG. 7 (e.g., video encoder 200) may scan for neighboring pixels and read pixels A, B, C, and D (represented as r(0), r(1), r(2), and r(3)). The hybrid video codec of FIG. 7 (which may be video encoder 200) may Hadamard transform the read pixels to create R(0), R(1), R(2), and R(3). The hybrid video codec of FIG. 7 (e.g., video encoder 200) may filter the transformed pixels by using a 16-entry lookup table, for example, to create F(0), F(1), F(2), and F(3). The hybrid video codec of FIG. 7 (e.g., video encoder 200) may inverse Hadamard transform the filtered pixels to create f(0), f(1), f(2), and f(3) which are also represented by A', B', C', and D'. The hybrid video codec of FIG. 7 (e.g., video encoder 200) may place the pixels A', B', C', and D' in an accumulation buffer in the positions originally occupied by pixels A, B, C, and D, respectively.

Figure 9:
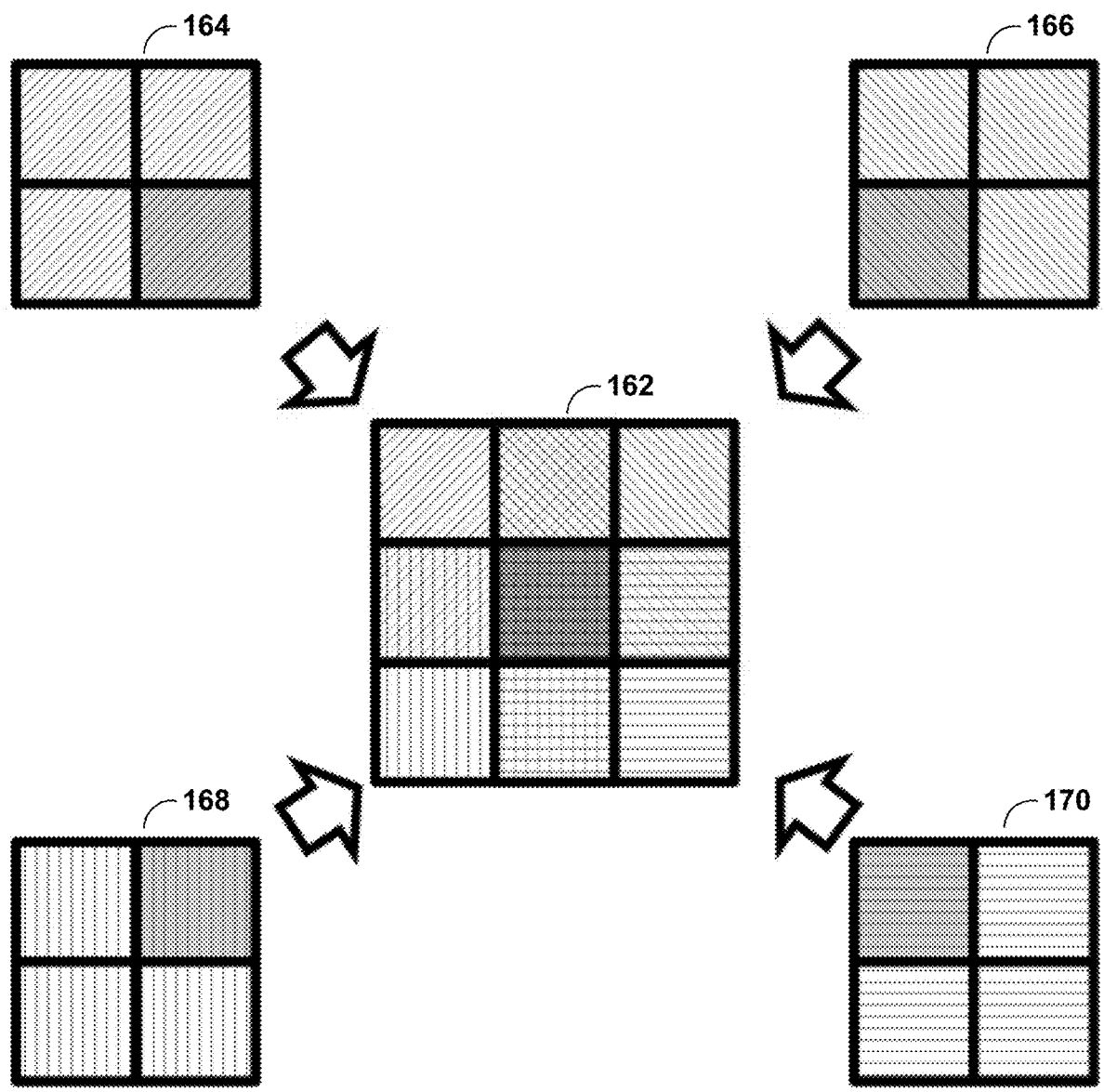
FIG. 9 is a conceptual diagram illustrating an equivalent filter shape.

FIG. 9 is a conceptual diagram illustrating an equivalent filter shape. An equivalent filter shape is 3×3 pixels as depicted in FIG. 9. It can be seen that all pixels in block 162 can be processed independently in case maximum parallelism is required or desired. It should also be noted that results of the 2×2 groups of filtering (164, 166, 168 and 170) are reused for spatial collocated samples. Generally, each new pixel in the block 162 requires one 2×2 filtering, with the other three being reused.

Another in-loop processing module utilized in video coding design is an in-loop luma reshaper studied in Pu et al., "CE12-4: SDR In-loop Reshaping," Joint Video Experts Team (WET) of ITU-T SG 16 WP 3 and ISO/IEC JTC 1/SC 29/WG 11, 12th Meeting: Macao, CN, 3-12 Oct. 2018, document JVET-L0246 (hereinafter, "WET-L0246") and Lu et al., "CE12-related: Universal low complexity reshaper for SDR and HDR video," Joint Video Experts Team (WET) of ITU-T SG 16 WP 3 and ISO/IEC JTC 1/SC 29/WG 11, 12th Meeting: Macao, CN, 3-12 Oct. 2018, document WET-L0247 (hereinafter, "WET-L0247"). WET-L0246 and WET-L0247 describe an implementation of an in-loop luma reshaper as a pair of look-up tables (LUTs), which are approximately invertable and defined by a single set of piece-wise linear parameters.

JVET-L0246 and WET-L0247 described implementing a LUT as a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT$[Y_i]$ The other LUT is an inverse LUT, InvLUT, that maps altered code values $Y_r$ to $\hat{Y}_i$: $\hat{Y}_i$=InvLUT$[Y_r]$. ($\hat{Y}_i$ represents the reconstruction values of $Y_i$.)

For intra slices, only the InvLUT is applied. For inter slices, both FwdLUT and InvLUT are applied. LUTs are applied before loop filtering for both intra and inter slices. Processing operations and data flow may be identical for standard dynamic range (SDR) and high dynamic range (HDR).

Figure 10:
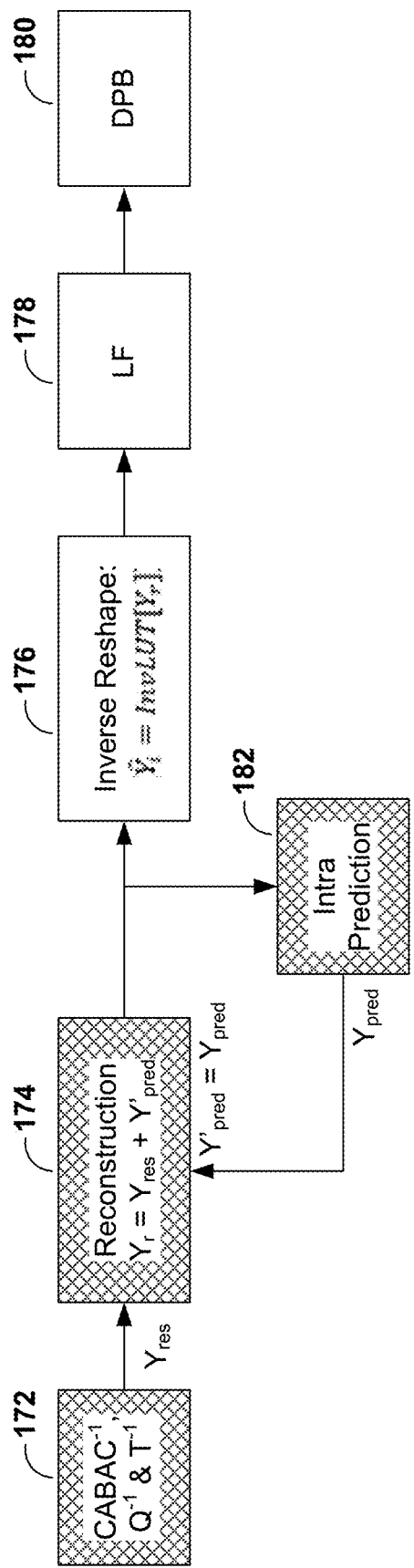
FIG. 10 is a block diagram illustrating an example of intra slice reconstruction with in-loop luma reshaper in core experiment 12-1 (CE12-1).

Example processing operations for intra slices are illustrated in FIG. 10. FIG. 10 is a block diagram illustrating an example of intra slice reconstruction with in-loop luma reshaper in core experiment 12-1 (CE12-1). In FIG. 10, crosshatched blocks indicate signals in a reshaped domain: luma residue; intra luma predicted; and intra luma reconstructed. InvLUT maps intra reconstructed values in the reshaped domain to intra reconstructed values in the original domain. ($\hat{Y}_i$=InvLUT$[Y_r]$). In FIG. 10 and elsewhere in this disclosure, "DPB" may be used to indicate a decoded picture buffer and "LF" may be used to indicate a loop filter.

CABAC 172 may generate a luma residual $Y_{res}$. Reconstruction unit 174 may create an intra luma reconstructed signal $Y_r$ by combining the luma residual $Y_{res}$ with an intra luma predicted signal $Y_{pred}$ from intra prediction unit 182. Intra prediction unit 182 may intra predict intra luma predicted signal $Y_{pred}$ based on $Y_r$. Inverse reshape unit 176 may inverse reshape $Y_r$ to generate inverse reshaped signal $\hat{Y}_i$. LF 178 which may apply a loop filter to inverse reshaped signal $\hat{Y}_i$ and output a loop filtered block to DPB 180.

Figure 11:
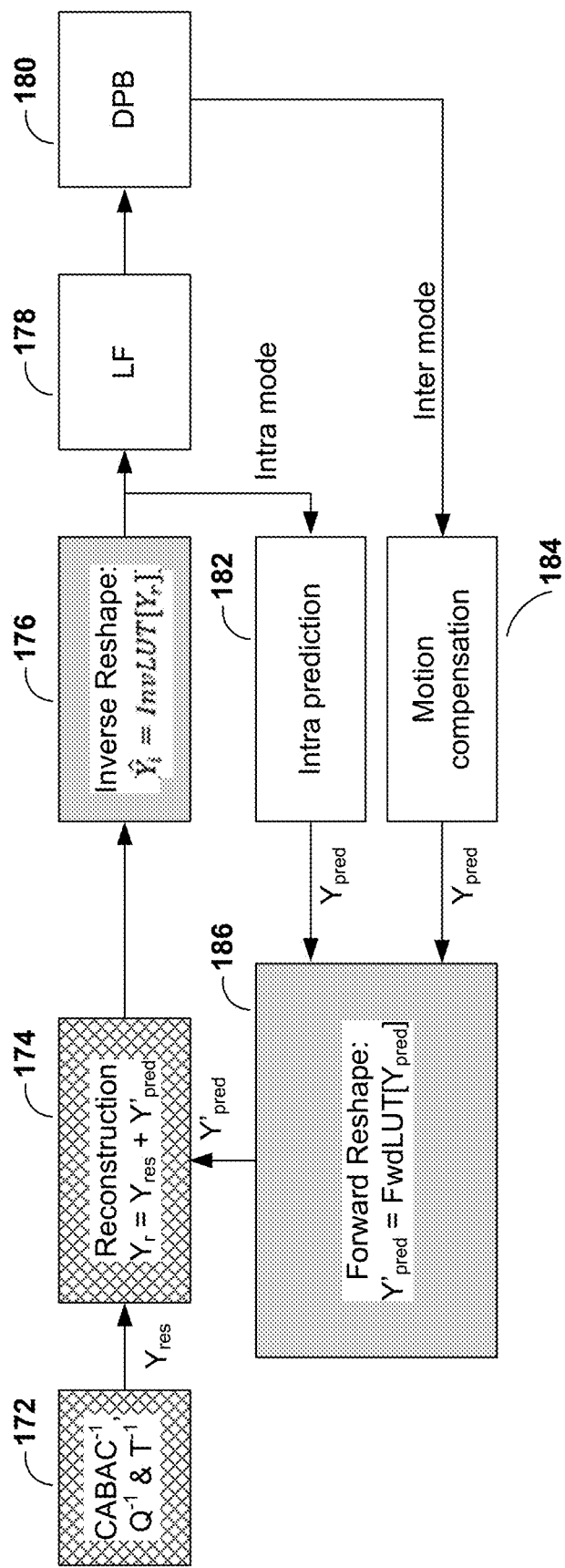
FIG. 11 is a block diagram illustrating an example inter slice reconstruction with in-loop luma reshaper in CE12-1.

Example processing operations for inter slices are illustrated in FIG. 11. FIG. 11 is a block diagram illustrating an example inter slice reconstruction with in-loop luma reshaper in CE12-1. In FIG. 11, crosshatched blocks indicate signals in the reshaped domain: luma residue and intra luma reconstructed. FwdLUT maps motion-compensation values in the original domain to the reshaped domain. (FwdLUT$[Y_{pred}]$). InvLUT then maps inter reconstructed values in the reshaped domain to inter reconstructed values in the original domain. ($\hat{Y}_i$=InvLUT$[Y_{res}$+FwdLUT$[Y_{pred}]]$).

The elements of FIG. 11 function similarly to the elements of FIG. 10 as described above. Elements in FIG. 11 that are not depicted in FIG. 10 include motion compensation unit 184 and forward reshape unit 186. Motion compensation unit 184 may apply motion compensation to decoded luma signals stored in DPB 180 to generate an inter predicted luma signal $Y_{pred}$ for inter mode. Forward reshape unit 186 may reshape a predicted luma signal $Y_{pred}$ (from intra prediction unit 182 and/or motion compensation unit 184 depending on intra, inter or inter/intra mode).

The reshaper model syntax signals a piece-wise linear (PWL) model with 32 equal pieces. In core experiment 12 (CE-12) software, the PWL model is used to precompute the 1024-entry FwdLUT and InvLUT mapping tables; but the PWL model also allows implementations to calculate identical mapping values on-the-fly without pre-computing the LUTs.

Conceptually, PWL is implemented in the following way: x1, x2 are two input pivot points, and y1, y2 are their corresponding output pivot points for one piece. The output value y for any input value x between x1 and x2 can be interpolated by the following equation:

$$y=((y2-y1)/(x2-x1))*(x-x1)+y1$$

In a fixed point implementation, the equation can be rewritten as $$y+((m*x+2^{FP\_PREC-1})>>FP\_PREC)+c$$

where m is scalar, c is an offset, and FP_PREC is a constant value to specify the precision.

The syntax (Annex A of JVET-L0246 or JVET-L0247) specifies the number of codewords in each piece explicitly, therefore, video decoder 300 can compute the pivot points directly.

Figure 12:
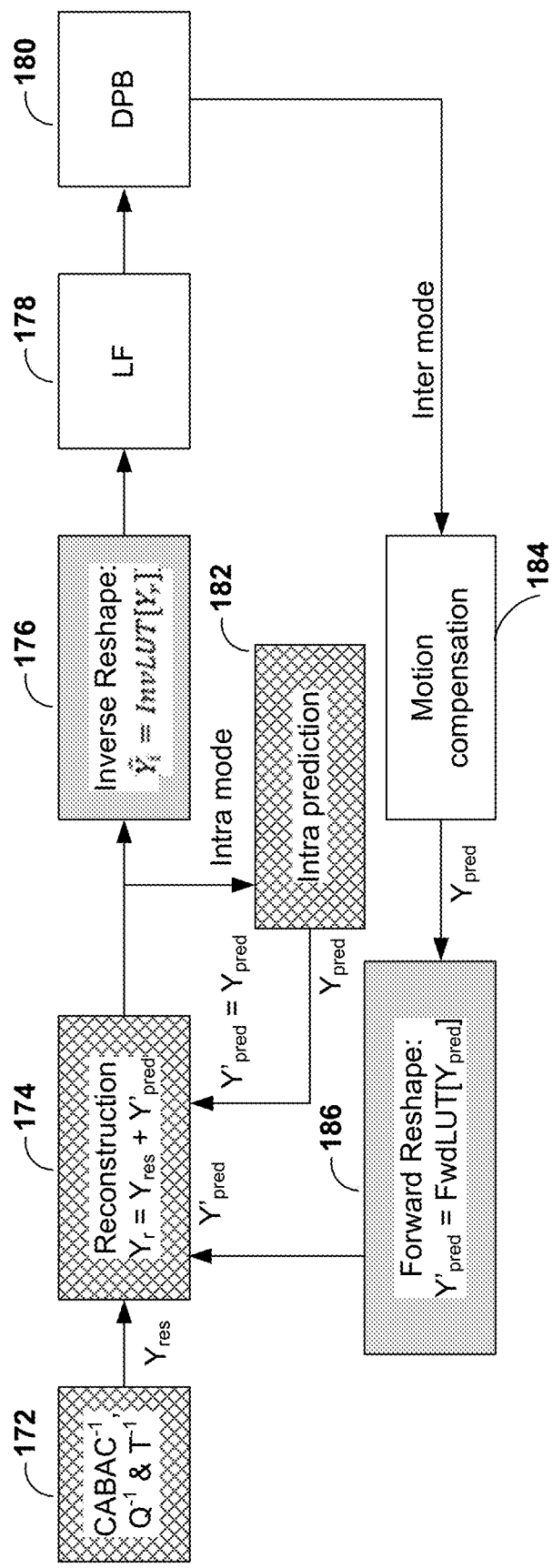
FIG. 12 is a block diagram illustrating an example inter slice reconstruction with in-loop luma reshaper in core experiment 12-2 (CE12-2).

To reduce complexity of the design, the following implementation was further described in JVET-L0246/JVET-L0247 and is shown in FIG. 12. FIG. 12 is a block diagram illustrating an example inter slice reconstruction with in-loop luma reshaper in core experiment 12.2 (CE12-2). The elements of FIG. 12 function similarly to the elements of FIG. 11 as described above. In FIG. 12, crosshatched blocks indicate signals in the reshaped domain: luma residue and intra luma reconstructed. As shown in FIG. 12, for intra TUs in inter slices, inverse reshape unit 176 is moved out of the critical intra prediction loop in inter slice decoding. In this example, intra prediction is always performed in the reshaped domain regardless of slice type. With such an arrangement, intra prediction may start immediately after previous TU reconstruction is performed. Such an arrangement may also provide a unified process for intra mode instead of a slice dependent process.

The major difference of operational domains between CE12-2 and CE12-1 is the intra prediction in inter slices. In addition, in CE12-2, the FwdLUT of inter predicted signals may be subsumed as part of motion compensation. Thus, the reconstruction pipeline is only affected by the InvLUT of the reconstructed sample, which may occur any time before loop filtering, and hence is not in the critical path. Table 3, below, lists the operational domains in CE12-1 and CE12-2 and explains how combined merge and intra prediction (a.k.a. multi-hypothesis prediction) is performed.

TABLE 3

|  | CE12-1 | CE12-2 |
| --- | --- | --- |
| Intra Prediction (IP) in intra slice | Reshaped domain | Reshaped domain |
| Intra Prediction (IP) in inter slice | Original domain | Reshaped domain |
| Inter Prediction (MC) | Original domain | Original domain |
| Loop Filtering | Original domain | Original domain |
| Combined merge and intra prediction | IP in original domain, MC is original domain. Combined predicted signal obtained from FwdLUT applied IP and FwdLUT applied MC | IP in reshaped domain, MC in original domain. Combined predicted signal obtained from IP and FwdLUT applied MC |

Figure 13:
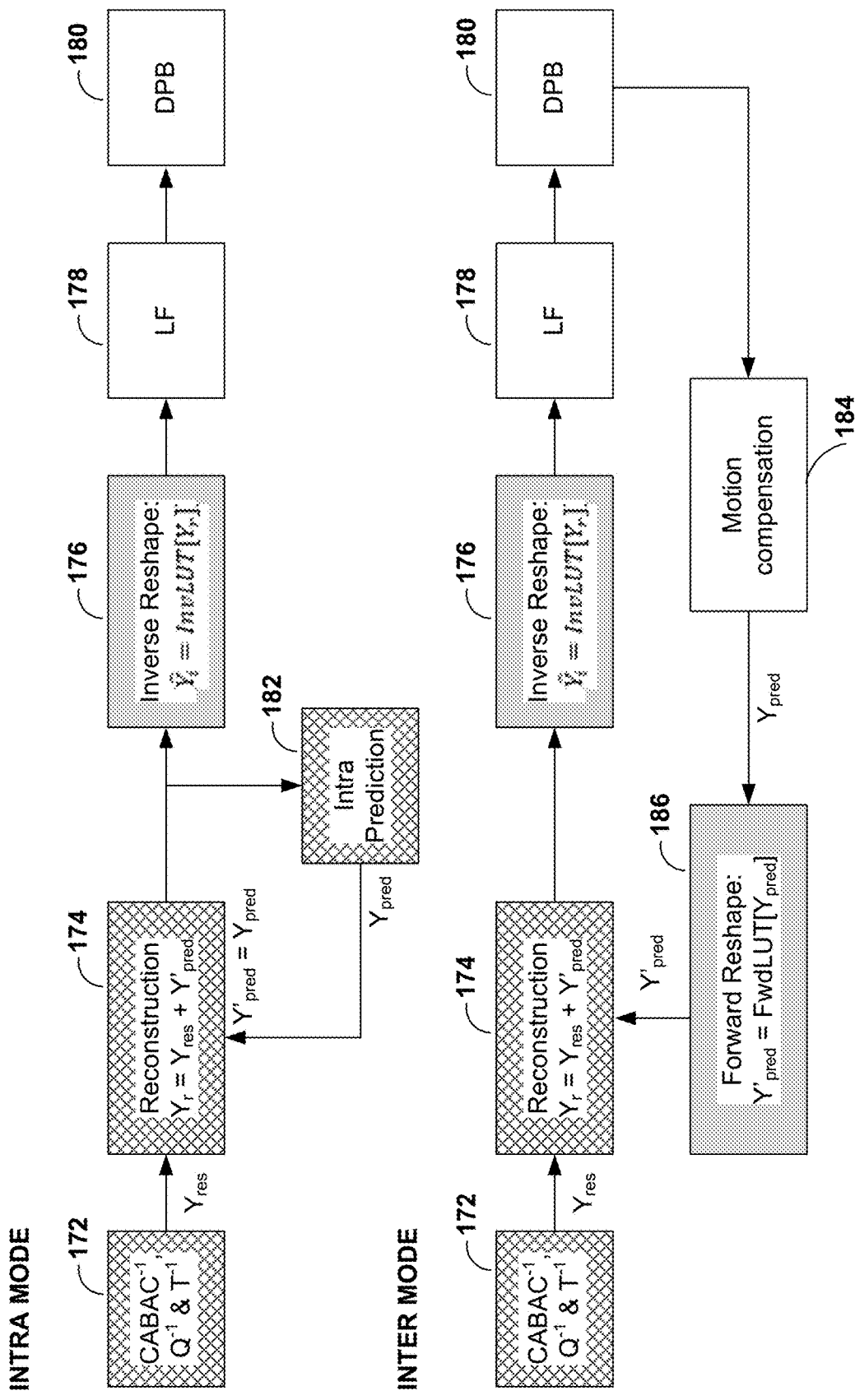
FIG. 13 is a block diagram illustrating an example intra mode and inter mode reconstruction with in-loop luma reshaper in CE12-2.

FIG. 13 is a block diagram illustrating an example intra mode and inter mode reconstruction with in-loop luma reshaper in CE12-2. In FIG. 13, crosshatched blocks indicate signals in the reshaped domain: luma residue and intra luma reconstructed. The elements of FIG. 13 function similarly to the elements of FIG. 12 described above.

Figure 14:
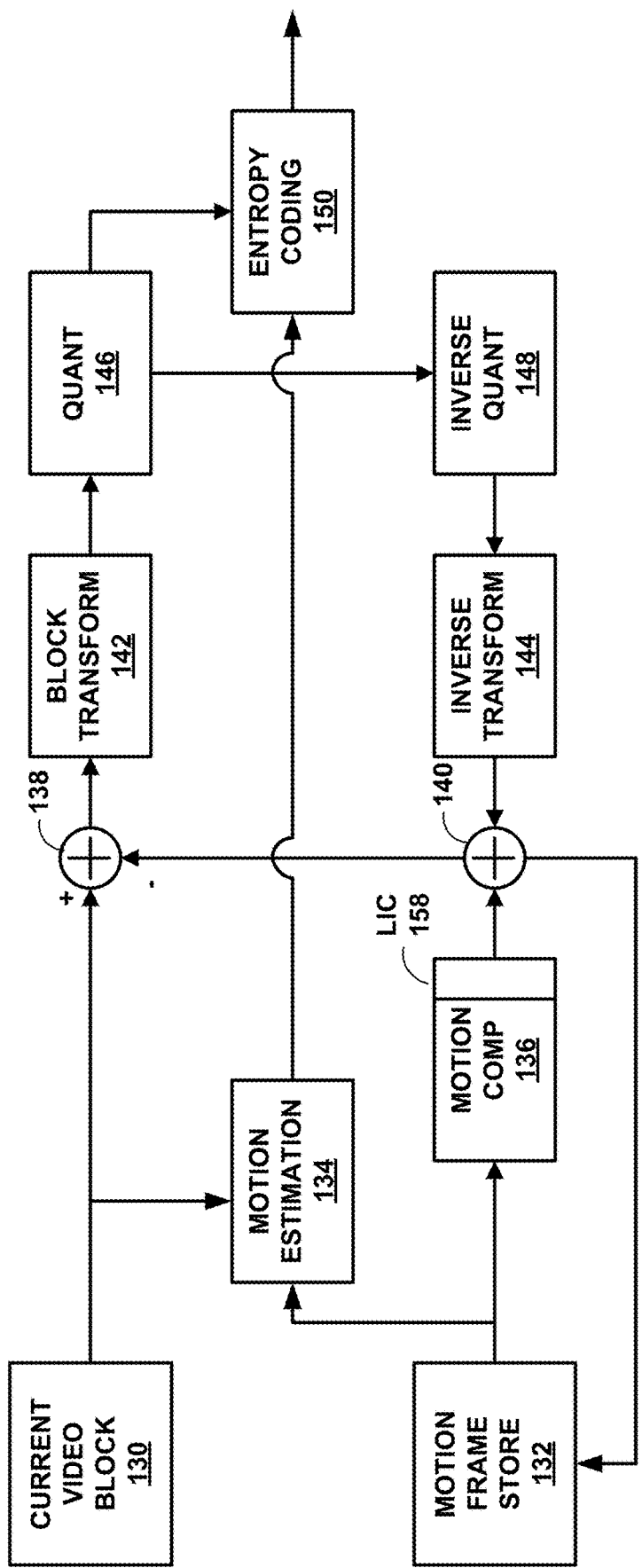
FIG. 14 is a block diagram illustrating an example inter prediction chain of a hybrid video codec with local illumination compensation (LIC) following the motion compensation stage.

FIG. 14 is a block diagram illustrating an example inter prediction chain of a hybrid video codec with local illumination compensation (LIC) following the motion compensation stage. The elements of FIG. 14 function similarly to the elements of FIG. 2 with the addition of Local Illumination Compensation (LIC) 158 between motion compensation unit 136 and reconstruction unit 140. LIC is another in-loop processing module utilized in video coding design and is applied in the prediction domain, as shown in FIG. 14. The design was proposed in Seregin et al., "CE10-related: Unidirectional illumination compensation," Video Experts Team (JVET) of ITU-T SG 16 WP 3 and ISO/IEC JTC 1/SC 29/WG 11, 13th Meeting: Marrakech, MA, 9-18 Jan. 2019, document JVET-M0500 (hereinafter, "JVET-M0500"). LIC is based on a linear model for illumination changes, using a scaling factor a and an offset b. LIC is enabled or disabled adaptively for each inter-mode coded CU.

Figure 15:
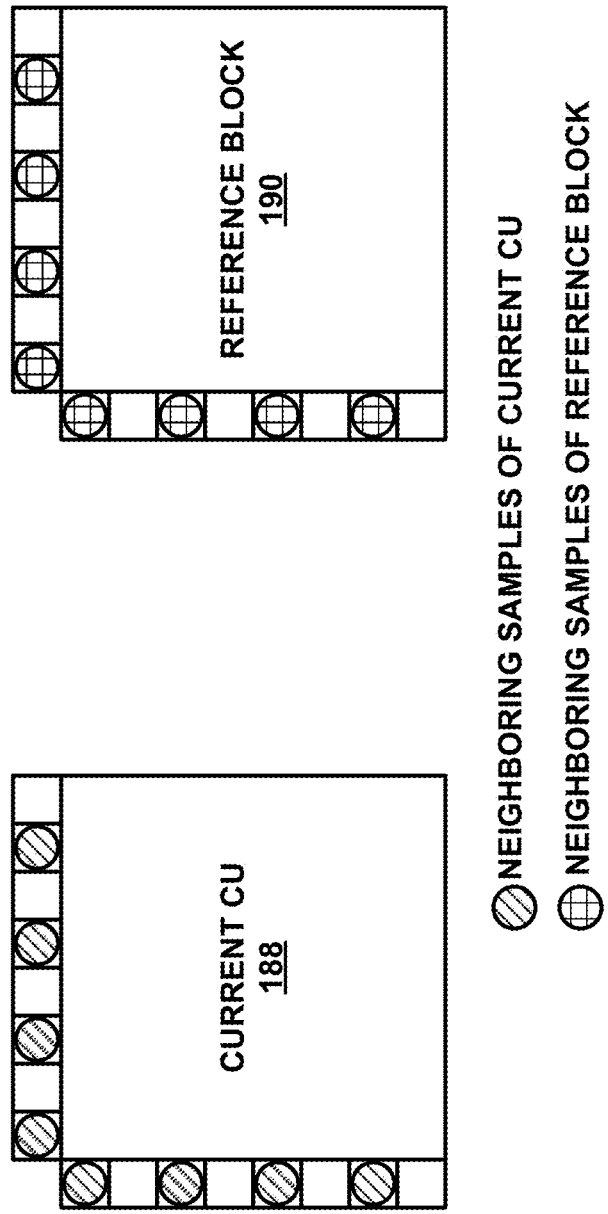
FIG. 15 is a conceptual diagram illustrating example neighboring samples of the current CU and neighboring samples of the current block.

When LIC applies for a CU, a least square error method is employed to derive the parameters a and b by using the neighboring samples of the current CU and their corresponding reference samples. FIG. 15 is a conceptual diagram illustrating example neighboring samples of a current CU 188 and neighboring samples of a reference block 190. Example neighboring samples of the current CU 188 and their corresponding reference samples (neighboring samples of the reference block 190) are depicted with slashed circles and hashed circles, respectively. More specifically, the sub-sampled (2:1 subsampling) neighboring samples of the CU and the corresponding samples (identified by motion information of the current CU or sub-CU) in the reference picture are used. The LIC parameters are derived and applied for each prediction direction separately. When a CU is coded with merge mode, the LIC flag is copied from neighboring blocks, in a way similar to motion information copy in merge mode; otherwise, an LIC flag is signaled for the CU (e.g., by video encoder 200) to indicate (e.g., to video decoder 300) whether LIC applies or not.

When LIC is applied to a CU, a predicted signal in direction k may be generated by $$\text{pred}_{LIC}(i,j,k) = a \cdot \text{pred}(i,j,k) + b$$

where $\text{pred}_{LIC}(i, j, k)$ represents the finally predicted signal in reference list k (k=0 or 1) and pred(i, j, k) represents the predicted signal (which may be based on some inter-prediction information such as reference index and motion vector from reference list k). A video coder (e.g., video encoder 200 or video decoder 300) may derive parameters a and b by minimizing regression error between neighboring reconstructed and predicted samples around the current block.

When LIC is enabled for a picture, an additional CU level rate distortion (RD) check is needed to determine whether LIC is applied or not for a CU. When LIC is enabled for a CU, mean-removed sum of absolute difference (MR-SAD) and mean-removed sum of absolute Hadamard-transformed difference (MR-SATD) may be used, instead of SAD and SATD, for integer pel motion search and fractional pel motion search, respectively.

To reduce the encoding complexity, the following encoding scheme is applied in the JEM: LIC is disabled for the entire picture when there is no obvious illumination change between a current picture and its reference picture(s). To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

In the design described in JVET-M0500 for LIC, the linear model parameters derivation is kept unchanged and the LIC is applied on a CU basis. The LIC of JVET-M0500 is not applied to sub-block based inter prediction, such as ATMVP or affine, triangular partition, multi hypothesis intra inter and bi-directional prediction.

In the design described in JVET-M0500, LIC is not applied to bi-directional prediction (also referred to as bi-prediction), since the reconstructed neighboring samples of the current block are not required to perform inter prediction in the inter pipeline and thus may not be available for each uni-directional inter prediction, which otherwise would be required for LIC since the weighted average for bi-prediction is applied after deriving uni-directional predictors. Also, having LIC applied to bi-directional prediction introduces an additional coding stage due to performing the LIC process before the weighting.

Figure 16:
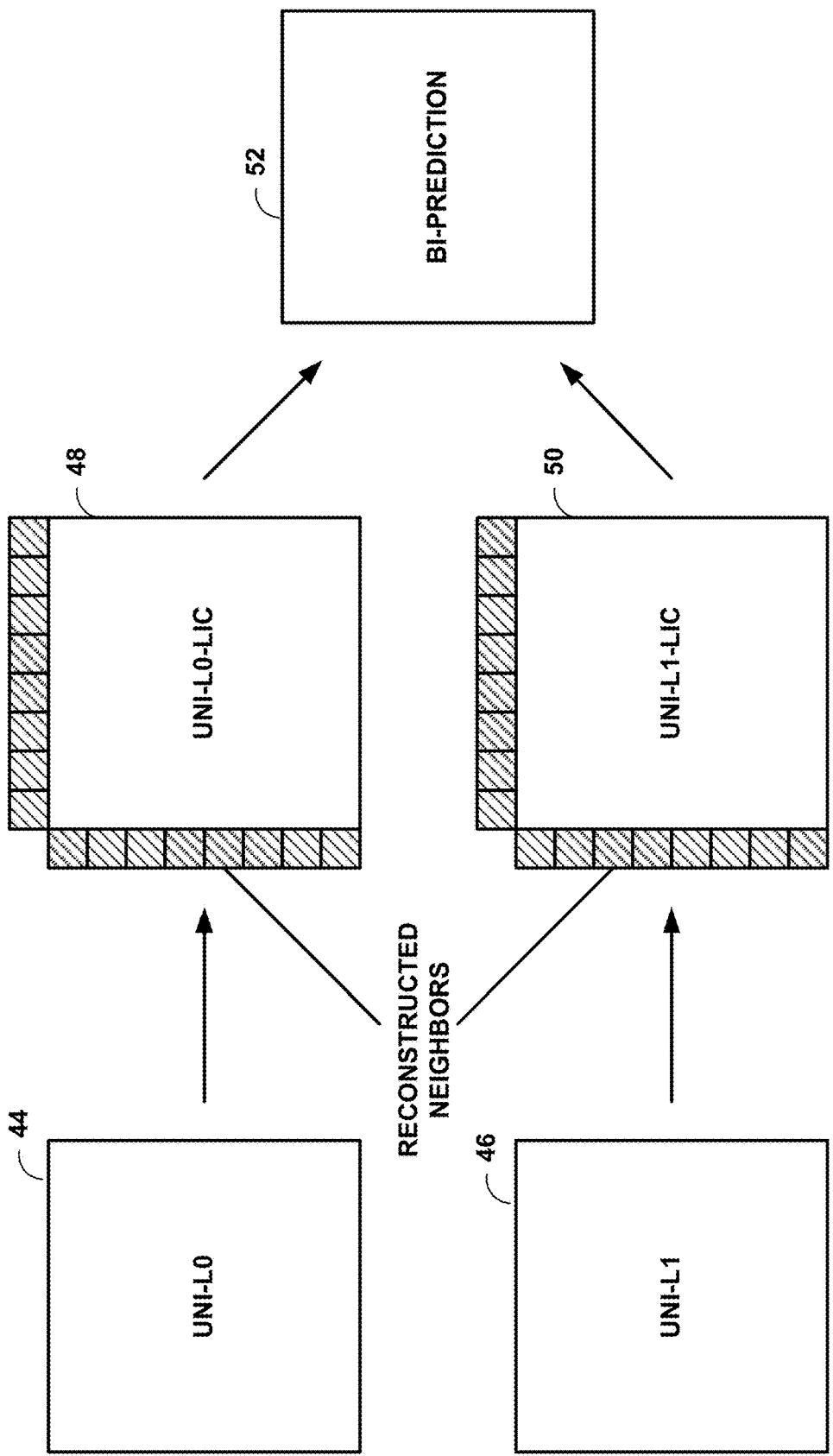
FIG. 16 is a block diagram illustrating an example of LIC with bi-prediction.

While not permitted in the design described in JVET-M0500, LIC may, in some examples, be applied with bi-prediction. FIG. 16 is a block diagram illustrating an example of LIC with bi-prediction. In the example of FIG. 16, for each of uni-L0 44 and uni-L1 46, a video coder, such as video encoder 200 or video decoder 300, uses reconstructed neighbors to derive the scaling factor a and an offset b as discussed above. The video coder then uses the uni-L0 LIC output 48 and the uni-L1 LIC output 50 to complete bi-prediction 52.

Figure 17:
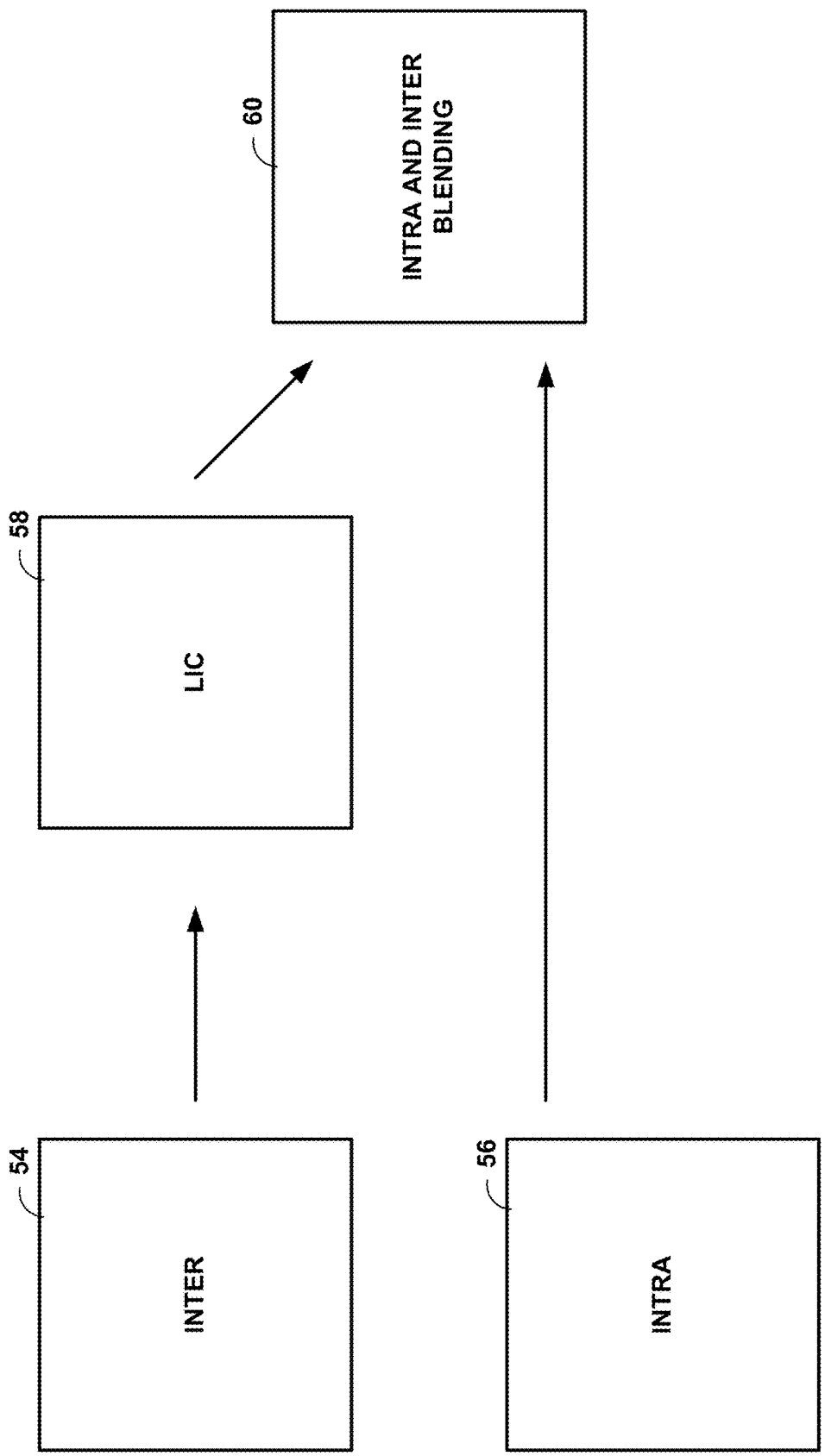
FIG. 17 is a block diagram illustrating an example of LIC with multi hypothesis intra inter.

For the same reasoning as not permitting LIC with bi-prediction in JVET-M0500, LIC is not applied for the multi hypothesis intra inter because LIC is applied after inter prediction and the weighting between intra and inter would be delayed by the LIC process. While not permitted in the design described in JVET-M0500, LIC may, in some examples, be applied with multi hypothesis intra inter. FIG. 17 is a block diagram illustrating an example of LIC with multi hypothesis intra inter. In the example of FIG. 17, LIC 58 may be applied after inter prediction 54 and the resulting signal may be blended with the intra prediction 56 signal as shown to generate intra and inter blending 60.

An LIC flag is included as a part of motion information in addition to motion vectors (MVs) and reference indices. For example, video encoder 200 may signal an LIC flag and video decoder 300 may determine whether to apply LIC based on the signaled LIC flag. However, when a merge candidate list is constructed, the LIC flag is inherited from the neighbor blocks for merge candidates, but LIC is not used for motion vector pruning for simplification purposes. The LIC flag is not stored in the motion vector buffer of the reference picture, so the LIC flag is always set equal to false for TMVP. The LIC flag is also set equal to false for bi-directional merge candidates, such as par-wise average candidate, and zero motion candidates. When LIC tool is not applied, the LIC flag is not signaled (e.g., by video encoder 200).

Figure 18:
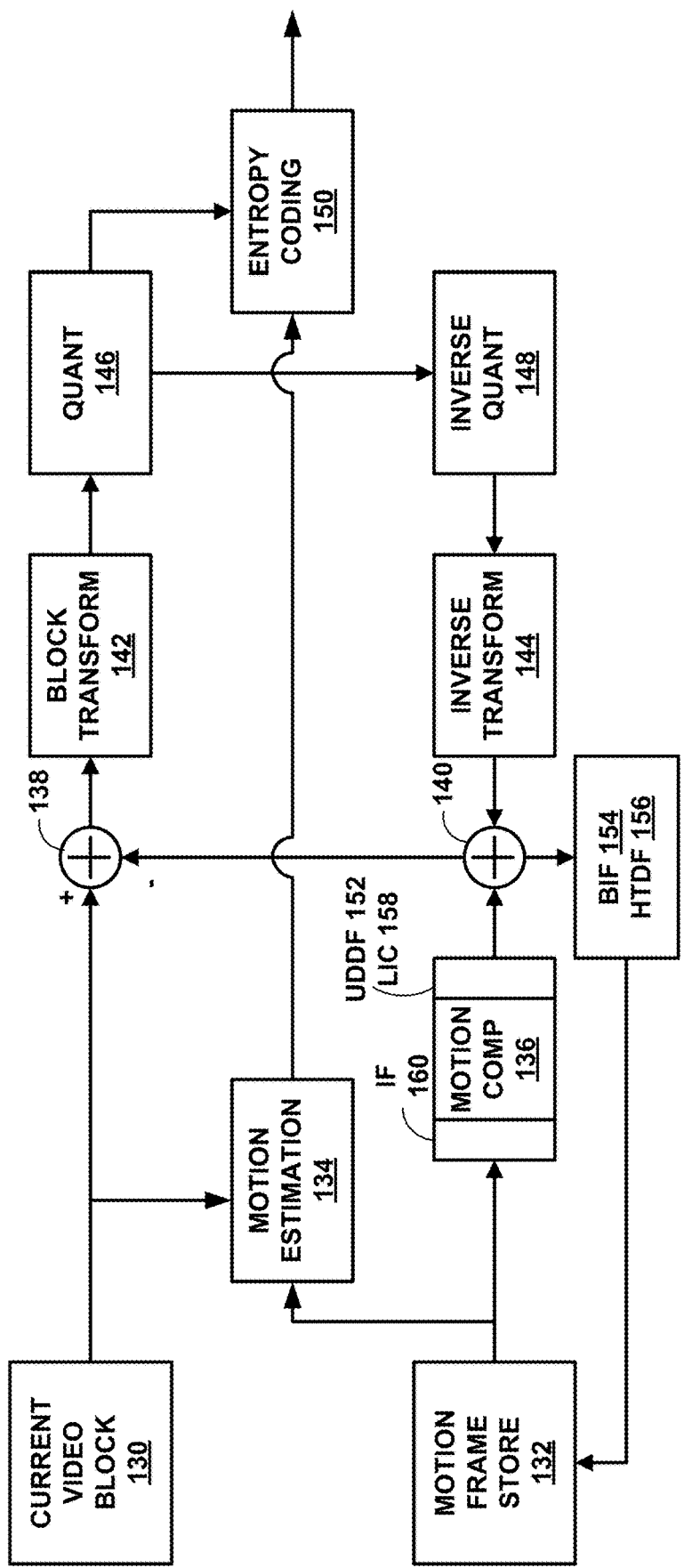
FIG. 18 is a conceptual diagram illustrating an example inter prediction chain with filtering/scaling method implemented in a prediction sample domain.

Several sample-level filtering/scaling (or sample mapping) based in-loop methods have been proposed to improve video coding performance. Some of these tools, such as UDDF or LIC are described as being implemented in the prediction samples domain, at the stage following the motion compensation, as shown in FIG. 18. FIG. 18 is a conceptual diagram illustrating an example inter prediction chain with filtering/scaling method implemented in prediction sample domain. The elements of FIG. 18 are function similarly to the elements of FIGS. 2, 4, 5, 7 and 14 with interpolation filtering (IF) 160 added between motion frame store 132 and motion compensation unit 136. Other tools, such as BIF 154 and/or HTDF 156 may be implemented in the reconstruction samples domain, following the reconstruction stage. As it can be seen from FIG. 18, these processing modules are implemented as an additional stage to the existing interpolation filtering. UDDF 152 and/or LIC 158 are directly following the interpolation filtering, whereas BIF 154 and/or HTDF 156 are separated from interpolation filtering by a linear operation of summation.

Cascading of filtering stages may be redundant and may be combined in a single processing stage. This disclosure discloses several methods that may potentially improve compression efficiency by harmonization and/or joint optimization of the interpolation filtering with other in-loop modules such as BIF, UDDF, HTDF, Reshaper and LIC. To further reduce computation and implementation complexity, some of these techniques may be combined with interpolation into a single processing stage and applied in the predicted samples domain, e.g., taking reference samples as well as reconstructed samples as input and deriving predicted samples as output. For example, video decoder 300 may use reference samples and reconstructed samples and derive a predicted sample.

Figure 19:
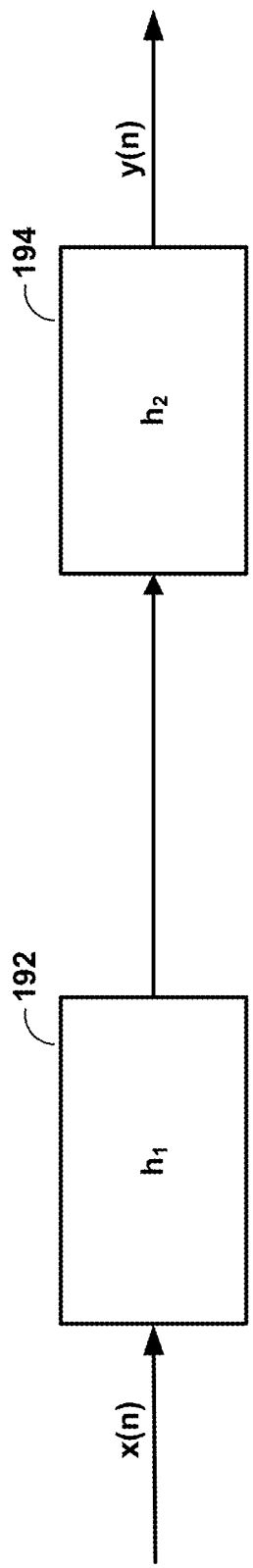
FIG. 19 is a block diagram illustrating an example cascade of filters $h_1$ and $h_2$.

In some examples, video encoder 200 or video decoder 300 may generate filtered samples by applying, to an input signal, a filter implemented by convolving a result of convolving the input signal with a first finite impulse response (FIR) filter with a second FIR, filter the first FIR filter providing motion compensated prediction, the second FIR filter being a second filter from a group of one or more of a BIF, HTDF, reshaper, or LIC. In some examples of this disclosure, sub-pel interpolation providing motion compensation prediction with a fractional-pel accuracy (e.g. ¼, ⅛ or 1/16) and implemented through input signal x(n) convolution with FIR filter $h_1$, may be cascaded with another coding tool implemented via convolution with another FIR having pulse response $h_2$:

$$y(n) = h_2 \otimes (h_1(n) \otimes x(n))$$

where x(n) is 1D input signal, $h_1$(n) is a FIR of the first process and $h_2$(n) is FIR of the second process and symbol $\otimes$ defines convolution. This example is given as 1D filtering, 2D filtering may be implemented through a cascaded separable 1D filtering, e.g., horizontal filtering first, followed by 1D filtering in the vertical direction. FIG. 19 is a block diagram illustrating an example cascade of filters $h_1$ and $h_2$. In FIG. 19, first filter 192 ($h_1$) receives input signal x(n), filters the input signal x(n) and provides the filtered signal to second filter 194 ($h_2$). Second filter 194 ($h_2$) filters the signal provided by first filter 192 ($h_1$) and generates the filtered signal y(n). For example, video encoder 200 or video decoder 300 may filter input signal x(n) in a cascaded manner through first filter 192 ($h_1$) and second filter 194 ($h_2$).

In some examples, first filter 192 ($h_1$) defines an interpolation filter response associated with a certain phase (sub-sample position). Examples of such pulse responses are given in Table 2 above.

In some examples, second filter ($h_2$) pulse response can represent one of the UDDF filters given by Eq (1) or Eq (2) set forth above, e.g.:

$$h_2 = (0.5)^4 \begin{pmatrix} 1 \\ 0 \\ 4 \\ 0 \\ 6 \\ 0 \\ 4 \\ 0 \\ 1 \end{pmatrix} \text{ or } h_2 = 0.5 * (1, 4, 1)$$

In the latter case, the 2D filter of Eq (1) can be approximated through a separable 1D filtering with its transpose version:

$$h^I = 0.125 * \text{round}(h'_2 * h_2/4) = 0.125 * \begin{pmatrix} 0 & 1 & 0 \\ 1 & 4 & 1 \\ 0 & 1 & 0 \end{pmatrix}$$

In some examples, second filter 194 ($h_2$) pulse response can represent 1D decomposition of the BIF of Eq (3) set forth above. As such a BIF may be an adaptive filter. Some adaptive filters, such as a BIF, may be non-linear filters. Other adaptive filters may be linear filters. Note, "plus-shape" BIF can be implemented through a 3×3 FIR with adaptive pulse response expressed by adaptive weights W0 . . . W4:

$$h^{bif} = \begin{pmatrix} 0 & W2 & 0 \\ W1 & W0 & W3 \\ 0 & W4 & 0 \end{pmatrix}$$

Where adaptive weights W1 ... W4 to be derived as shown in Eq.(4) set forth above and weight W0 for central location $P_{0,0}$ is determined as:

$$W0 = 1 - \sum_{k=1}^{4} Wk$$

In some examples, $h_2(n)$ can express exact or approximated operations of HTDF or reshaping process.

In some examples, process of scaling/clipping or rounding of results of convolution with $h_1(n)$ can be omitted to preserve signals at the higher accuracy representation. For example, video encoder 200 or video decoder 300 may omit scaling/clipping or rounding of the results of the convolution with $h_1(n)$.

In some other examples, video encoder 200 or video decoder 300 may generate filtered samples by applying, to an input signal, a filter implemented by convolving a result of convolving the input signal with a first finite impulse (FIR) filter with a second FIR, the second FIR filter providing motion compensated prediction, the first FIR filter being the second filter from a group of one or more of a BIF, HTDF, reshaper, or LIC. For example, interpolation filtering can be implemented at the second stage, thus be second filter 194 ($h_2$) whereas the other filtering process (e.g., UDDF, BIF, HTDF, reshaper or LIC) may precede interpolation and be expressed by first filter's 192 ($h_1$) pulse response. This approach may reduce memory bandwidth requirements, considering that first filter 192 ($h_1$) may have a shorter tap length compared to second filter 194 ($h_2$).

In some examples, processing stages defined by convolution with $h_1$ and $h_2$ can be combined into a single stage implemented with FIR pulse response $h_{12}$ produced by convolving two respective FIR functions:

$$h_{12} = h_1 \otimes h_2$$

The latter implementation may reduce processing delay potentially caused by two stage implementations, as well as improve performance of the filtering process, since intermediate stages of clipping/rounding/shifting may be omitted in this process.

An example of such function is shown below
$h_1$=[0, 0, 0, 64, 0, 0, 0, 0]
$h_2$=[1, 4, 1]
$h_{12}$=[0, 0, 64, 256, 64, 0, 0, 0]
For example, video encoder 200 or video decoder 300 may generate the filtered samples by applying a filter defined by:

$$y(n)=x(n)\otimes(h_1(n)\otimes h_2(n))=x(n)\otimes h_{12}(n)$$

where y(n) is the filtered samples, x(n) is a 1-dimensional (1D) input signal, $h_1$ is an interpolation filter, $h_2$ is the second filter, and $h_{12}$ is a convolution of $h_1$ and $h_2$. In other examples, video encoder 200 or video decoder 300 may generate the filtered samples by applying a filter defined by:

$$y(n)=x(n)\otimes(h_1(n)\otimes h_2(n))=x(n)\otimes h_{12}(n)$$

where y(n) is the filtered samples, x(n) is a 1-dimensional (1D) input signal, $h_1$ is the second filter, $h_2$ is an interpolation filter, and $h_{12}$ is a convolution of $h_1$ and $h_2$.

In some examples, an approximation of the pulse response $h_{12}=h_1 \otimes h_2$ can be utilized to perform for certain class of signals. For example, video encoder 200 or video decoder 300 may use the approximation of the pulse response for certain classes of signals. In some examples, interpolation filters can be cascaded or combined with an adaptive filter(s) or scaling or sample mapping process, such as UDDF, BIF, HDTF or LIC. For example, video encoder 200 or video decoder 300 may generate the filtered samples by cascading or combining the interpolation filter with the second filter. In some examples, the second filter is an adaptive filter or scaler. In some examples, the adaptive filter or scaler is one of BIF, HTDF, or LIC.

A fixed interpolation filter set may be combined with a limited number of switchable or adaptive filters through a signaling mechanism providing video decoder 300 with an index to a specific filter $h_2$ function for a certain processing unit, e.g., sequence level/picture level/slice level/CTU level/ CU level/TU level/PU level or QTBT block level. For example, video encoder 200 or video decoder 300 may determine a candidate filter set and determine an index that indicates the second filter within the candidate filter set. Video encoder 200 may signal the combination of the fixed interpolation filters set and the switchable or adaptive filters and video decoder 300 may determine the combination by reading the signaling. The processing unit may be referred to as a block for simplicity throughout this disclosure.

Figure 20:
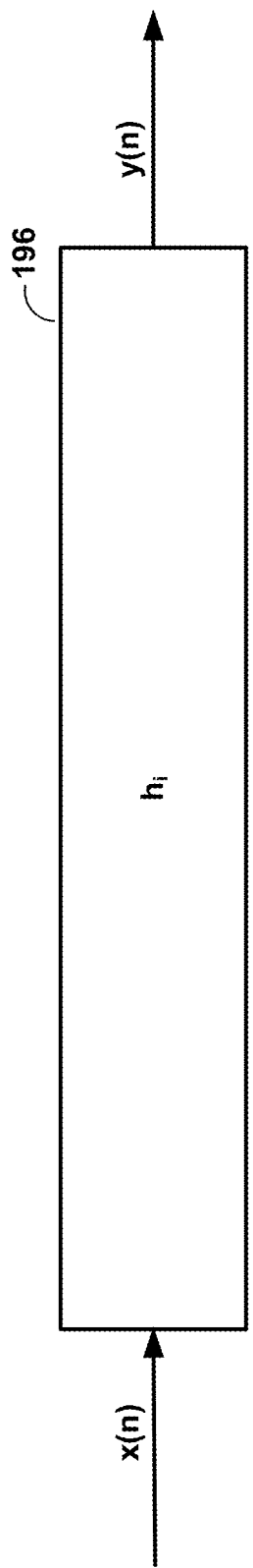
FIG. 20 is a block diagram illustrating a combined filter $h_i$.

In this disclosure, a total of N filters with different characteristics, such as filter length, cut-off frequencies, transition band, the amount of ripples, filter support area or adaptation process are defined as $\{h_i\}$, where i represents the index of a particular filter, for example $h_1, h_1 \ldots h_{N-1}$. Thus, the example of FIG. 19 may include N cascaded stages or filters. In some examples, the N filters may be combined in a single processing stage. FIG. 20 is a block diagram illustrating a combined filter hi. FIG. 20 depicts a single processing stage filter 196 ($h_i$).

For each block of video data, a subset of N filters (e.g., a set of candidate filters) may be defined and the index of the chosen filter(s) in the subset may be explicitly or implicitly signaled by video encoder 200 to video decoder 300. For example, video encoder 200 may explicitly signal the index of the chosen filter(s) and video decoder 300 may determine the chosen filter(s) by reading the signaling or video decoder 300 may imply the chosen filter(s). For example, one or more syntax elements may explicitly signal the index in a bitstream. The subset may be varied from one block to another based on certain criterion, such as hit-ratio of filters in previously coded blocks. For example, video encoder 200 or video decoder 300 may base the subset on how often a given filter was used on previously coded blocks. The proposed techniques of this disclosure may also be applicable to signal the filter selection for chroma components or integer pel.

Figure 21:
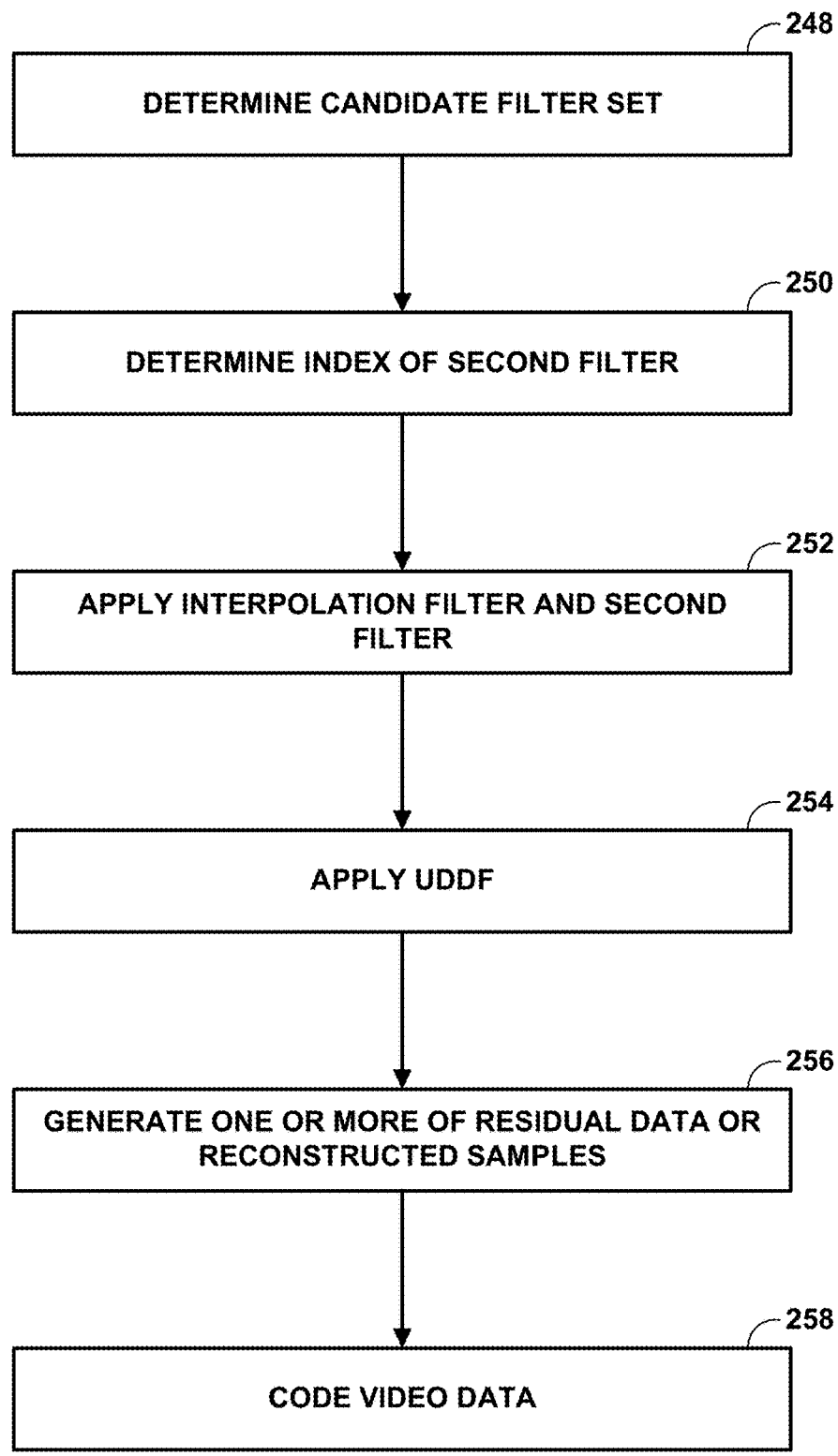
FIG. 21 is a flowchart illustrating example filtering techniques according to the present disclosure.

FIG. 21 is a flowchart illustrating example techniques according to the present disclosure. In some examples, video encoder 200 or video decoder 300 may determine a candidate filter set (248). In some examples, video encoder 200 or video decoder 300 may not determine a candidate filter set because the candidate filter set may not be used or the candidate filter set may be predetermined. In some examples, video encoder 200 or video decoder 300 may determine an index that indicates a second filter within the candidate filter set (250). Video encoder 200 or video decoder 300 may generate filtered samples by applying an interpolation filter and the second filter (252). For example, the application of the interpolation filter and the second filter may be in the predicted samples domain. The second filter may be one or more of an adaptive filter (e.g., BIF), a transform domain filter (e.g., HTDF), a scaler (e.g., reshaper) or LIC.

In some examples, video encoder 200 or video decoder 300 may also apply UDDF (254). For example, the application of UDDF may be in the predicted samples domain. In other examples, video encoder 200 or video decoder 300 may not apply UDDF. Video encoder 200 or video decoder 300 may generate one or more of residual data based on the filtered samples or reconstructed samples based on the filtered samples (256). Video encoder 200 or video decoder 300 may code the video data based on one or more of the residual data or the reconstructed samples (258).

As discussed above, in some examples, video encoder 200 or video decoder 300 may determine a set of candidate filters. In some examples, a set of candidate filters includes an interpolation filter set.

In some examples, a set of candidate filters includes a set of filters defining the UDDF, e.g., Eq (1) and Eq (2) set forth above.

In other examples, a set of candidate filters available for current block may be determined through the adaptive process defined in Eq (4) set forth above, e.g., a bilateral filter.

In other examples, a set of candidate filters available for a current block may be determined through the adaptive process defined in Eq (5) or Eq (6) set forth above, e.g., a transform domain filter, such as a bilateral HTDF.

In other examples, a set of candidate filters includes a set of filters defining LIC or reshaping operations.

In one example, a set of N filter candidates is fixed but only a sub-set of filter candidates may be applicable to blocks under a certain processing level, e.g., sequence level/picture level/slice level/CTU level/CU level/TU level/PU level. In this example, the sub-set of candidate filters and the size of the sub-set may change over different processing levels. The sub-set information, e.g., the size of sub-set and the filter indices, wherein there are N predefined filter candidates, may be implicitly or explicitly signaled and changed at a certain processing level. For example, video encoder 200 may explicitly signal the sub-set information and video decoder 300 may determine the sub-set information by reading the signaling or video encoder 200 may not explicitly signal the sub-set information and video decoder 300 may infer the sub-set information.

In one example, the set of candidate filters may be based on the statistics of previously coded blocks, such as gradient, intensity and intensity changes, variance or by parameters of the block partitioning, such as block sizes or prediction mode.

In one example, the set of candidate filters may be based on the filter used in the neighboring blocks (spatial and/or temporal blocks). For example, video encoder 200 or video decoder 300 may create a set of candidate filters based on the type of filter(s) used in neighboring blocks and/or filter parameters of neighboring blocks.

In one example, the sub-set of candidate filters may be formed based on which prediction mode is used in the current block, such as inter prediction direction, motion vector resolution/difference, decoder side motion derivation, Bi-directional Optical flow, and/or pixels in overlapped block motion compensation.

In one example, the sub-set of candidate filters may be formed based on the size/shape of the current block, the resolution of the current picture, the distance between the current and reference pictures, and/or QP values of reference pictures.

In some examples, for the given filter candidates, additional filter candidates may be generated by merging existing candidates. For example, for two given filter candidates, filters with an even phase shift from a 1st candidate may be merged with filters with an odd phase shift from a 2nd candidate, forming a 3rd candidate. Similarly, a 4th candidate may be constructed by combining filters with an odd phase shift from the 1st candidate with filters with an even phase shift from the 2nd candidate.

In some examples, candidate filters set may be determined by local signal statistics, such as local gradient, intensity and intensity changes, variance or by parameters of the block partitioning, such as block sizes or prediction mode. For example, video encoder 200 or video decoder 300 may determine a candidate filter set and determine an index that indicates the second filter within the candidate filter set. In some examples, video encoder 200 or video decoder 300 may determine the index based on local signal statistics.

Alternatively, the candidate filters set may be derived from other blocks that were encoded ahead of the current block, e.g., neighboring blocks. More specifically, blocks satisfying certain conditions may determine their filters by referring (inheriting) the filters chosen in other blocks, rather than going through the expensive search process to find the best filters. For example, for a block satisfying certain conditions, video encoder 200 or video decoder 300 may utilize filters used for other blocks.

In some examples, the candidate set of filters for certain blocks always choose a pre-determined default filter without any further search for or inheritance of the optimal filter from other blocks. For example, video encoder 200 or video decoder 300 may select a pre-determined default filter from the candidate set of filters for certain blocks. The default filter may not change throughout all the levels of processing units, e.g. sequence level/picture level/slice level/CTU level/CU level/TU level/PU level. As a simple example, the default filter may be always set as the $1^{st}$ candidate for the blocks that derive their MVs available information on motion flow, e.g. spatial MVP, TMVP, ATMVP, zero-MV merge candidates or affine MV candidates. In another example, the default filter may change over pictures/slices. For example, the most frequently-chosen filter in the previous picture(s)/slice(s) may be set as a default filter for all blocks belonging to the current picture/slice. Since video decoder 300 can mimic the same procedure without any side information from video encoder 200, explicit signaling of filter index may not be required.

In some examples, a syntax element named filter_index is signaled from the encoder to the decoder to indicate the filter candidate chosen for the blocks, or filter index in the filter candidate usage list. For example, video encoder 200 may signal filter_index and video decoder 300 may determine the filter candidate based on filter_index.

In some examples, filter_index may be binarized with any binarization code, such as fixed-length code, Exponential Golomb code, Unary code, or Truncated Unary code. As an example of Truncated Unary code when the sub-set size equals to 3, two flags (FLAG0, FLAG1) may be used to code filter_index=0, 1, 2 as (0, N/A), (1, 0), and (1, 1), respectively. Note that one flag, FLAG0, may be used to signal filter_index=0.

In some examples, filter_index may be inherited (or inferred) to be equal to 0 if the size of the current block is lower than P, where P is any integer and the size of the current block is calculated as M×N, where M and N are the width and height of the current block. Otherwise, filter_index may be derived from syntax elements in a bitstream. For example, video decoder 300 may determine whether the size of the current block is lower than P. If the size of the current block is lower than P, video decoder 300 may infer filter_index to be equal to 0. If the size of the current block is not lower than P, video decoder 300 may determine filter_index by reading syntax elements sent by video encoder 200 in a bitstream.

In some examples, filter_index is inherited to be equal to 0 if the current block is coded with uni (or bi-)-inter-prediction. If the current block is coded with bi-inter-prediction, filter_index is derived from syntax elements of a bitstream. For example, video decoder 300 may determine if the current block is coded with uni (or bi-)-inter-prediction and infer the filter_index to be equal to 0 if the current block is coded with uni (or bi-)-inter prediction. In some examples, if the current block is coded with bi-inter-prediction, video decoder may determine filter_index by reading syntax elements sent by video encoder 200 in the bitstream.

In some examples, candidate filters usage in spatio-temporal neighborhood (neighboring blocks) can be used to derive and constantly maintain (update) a candidate filter ID list (e.g., a list identifying candidate filters), analogous to the MVP merge list of HEVC. Video encoder 200 may determine, e.g., in a rate-distortion optimization (RDO) process, an optimal candidate filter among filters available in the candidate filter list and signal the index of the selected filter in the candidate filter list to video decoder 300. The optimal candidate filter may be identified from the candidate filter list by the signaled index (e.g., by video decoder 300) and applied at the encoder and decoder side, for example by video encoder 200 or video decoder 300. The signaled index may be referred to herein as a candidate filter ID.

Figure 22:
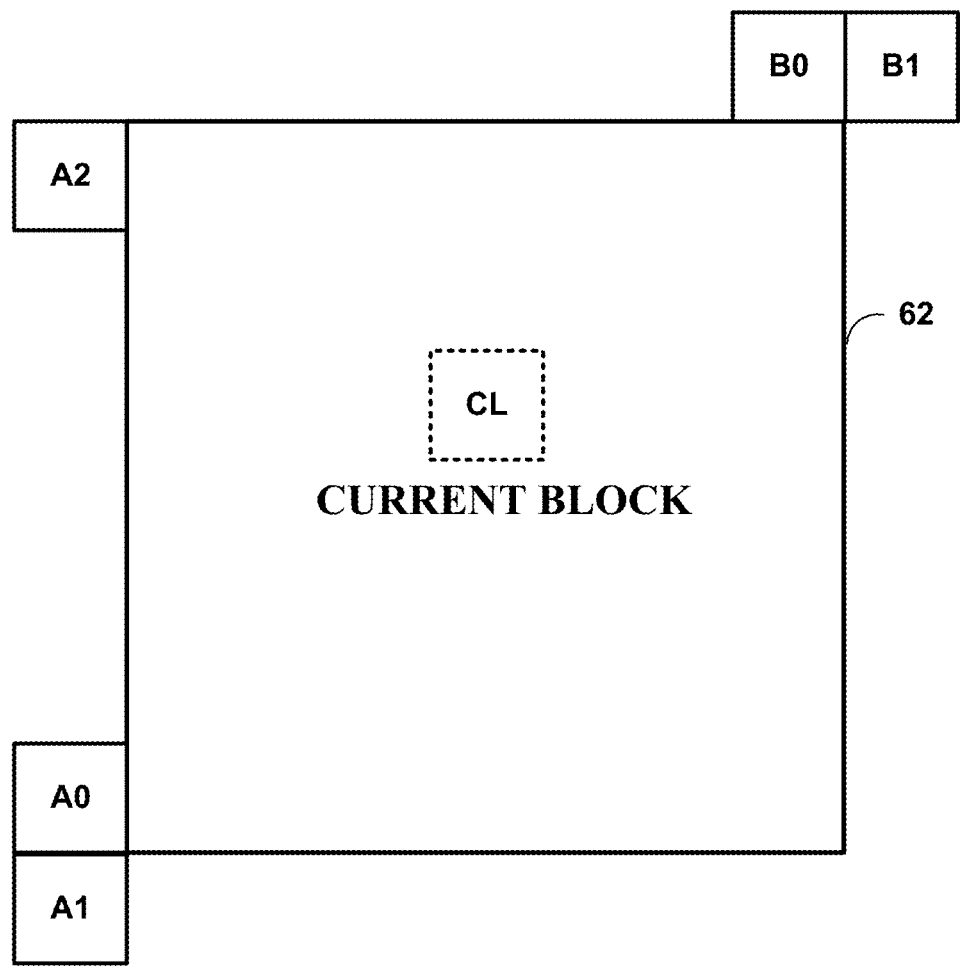
FIG. 22 is a conceptual diagram showing spatio-temporal neighbors of a current block.

FIG. 22 is a conceptual diagram showing spatio-temporal neighbors of a current block 62. In some examples, a candidate filter ID list construction process may include fetching of the candidate filter index from spatio-temporal neighbors in a predefined order, e.g., A1-B1-B0-A0-A2-Collocated (CL) position, similar to motion merge. A predefined pruning process, allowing candidate filter index redundancy check can be employed. For example, video encoder 200 or video decoder 300 may determine a candidate filter ID list by fetching the candidate filter index from spatial-temporal neighbors in a predefined order.

In some examples, a single candidate filter list can be maintained for all filter types, e.g., switchable interpolation, diffusion, bilateral, Hadamard or LIC. Local classification or adaptation process specified by utilized filter type is further applied. For example, video encoder 200 or video decoder 300 may maintain a single candidate filter list and apply a local classification or adaption process based on the utilized filter type.

Alternatively, an independent candidate filter list can be maintained for each of the used filter types, e.g., switchable interpolation, diffusion, bilateral, Hadamard or LIC. Usage of a specific filter type can be determined at the encoder and decoder side through an identical process and specific parameters of the filter (e.g., parameters of bilateral or Hadamard, or directionality of UDDF) may be inherited from the candidate filter list by a signaled index. For example, video encoder 200 or video decoder 300 may maintain an independent candidate filter list for each type of filter. Video encoder 200 may signal an index to video decoder 300 that is indicative of parameters of the filter.

In some examples, certain properties of the filters (e.g. directionality, or filter strength, or cut-off frequency) can be inherited from spatio-temporal neighboring blocks and filter type is either determined at the decoder side or derived from syntax elements signaled in bitstream. For example, video decoder 300 may determine properties of the filters from spatial-temporal neighboring blocks. Video decoder 300 may determine the filter type either by inferring the filter type or by reading a syntax element sent by video encoder 200 indicative of the filter type.

In some examples, a candidate filter ID can be inherited/determined from an area in the reference picture pointed to by a displacement vector (e.g., an MV). For example, video decoder 300 may infer a candidate filter ID from an area in a reference picture to which an MV points by, for example, using the candidate filter ID that was used in the area pointed to by the MV.

In some examples, a set of filter types planned for usage in the current picture or block of samples is signaled in the SPS/PPS/APS/Slice/tiles/CTU header. For example, video encoder 200 may signal a set of filter types planned for usage in a current picture or block of samples in the SPS, PPS, APS, slice, tile and/or CTU header, and video decoder 300 may determine the set of filter types by reading the signal.

To derive LIC parameters, reconstructed neighbor samples of a current block and neighbor samples of the reference block may be considered. Reshaping tool can be applied in the current picture meaning that the reconstructed current block neighbors may be in the reshaped domain. However, reference block and reference block neighbors may not be in the same reshape domain. For example, video encoder 200 or video decoder 300 may derive, based on reshaped samples, LIC parameters for a current block of the video data. The reshaped samples may include one or more of: reshaped reconstructed neighbor samples of the current block; reshaped neighbor samples of a reference block; or reshaped samples of the reference block. Video encoder 200 or video decoder 300 may generate a first predicted signal for the current block. Video encoder 200 or video decoder 300 may use the LIC parameters to generate a second predicted signal by applying LIC to the first predicted signal. Video encoder 200 or video decoder 300 may generate one or more of residual data based on the second predicted signal or reconstructed samples of the current block based on the second predicted signal. Video encoder 200 or video decoder 300 may code the video data based on one or more of the generated residual data or the reconstructed samples.

According to the techniques of this disclosure, a principle of the deriving LIC parameters when reshaping is used is to derive parameters in the same domain, i.e., either in the original domain (without reshaping) or in the same reshaped domain for both neighbor samples of the current and reference blocks. For example, video encoder 200 or video decoder 300 may derive parameters for both neighbor samples of the current and reference blocks in the same domain.

To achieve this principal, forward and/or inverse reshaping may be applied to the reconstructed neighbor samples of the current block and/or neighbor samples of the reference block and/or samples of reference block.

Figure 23:
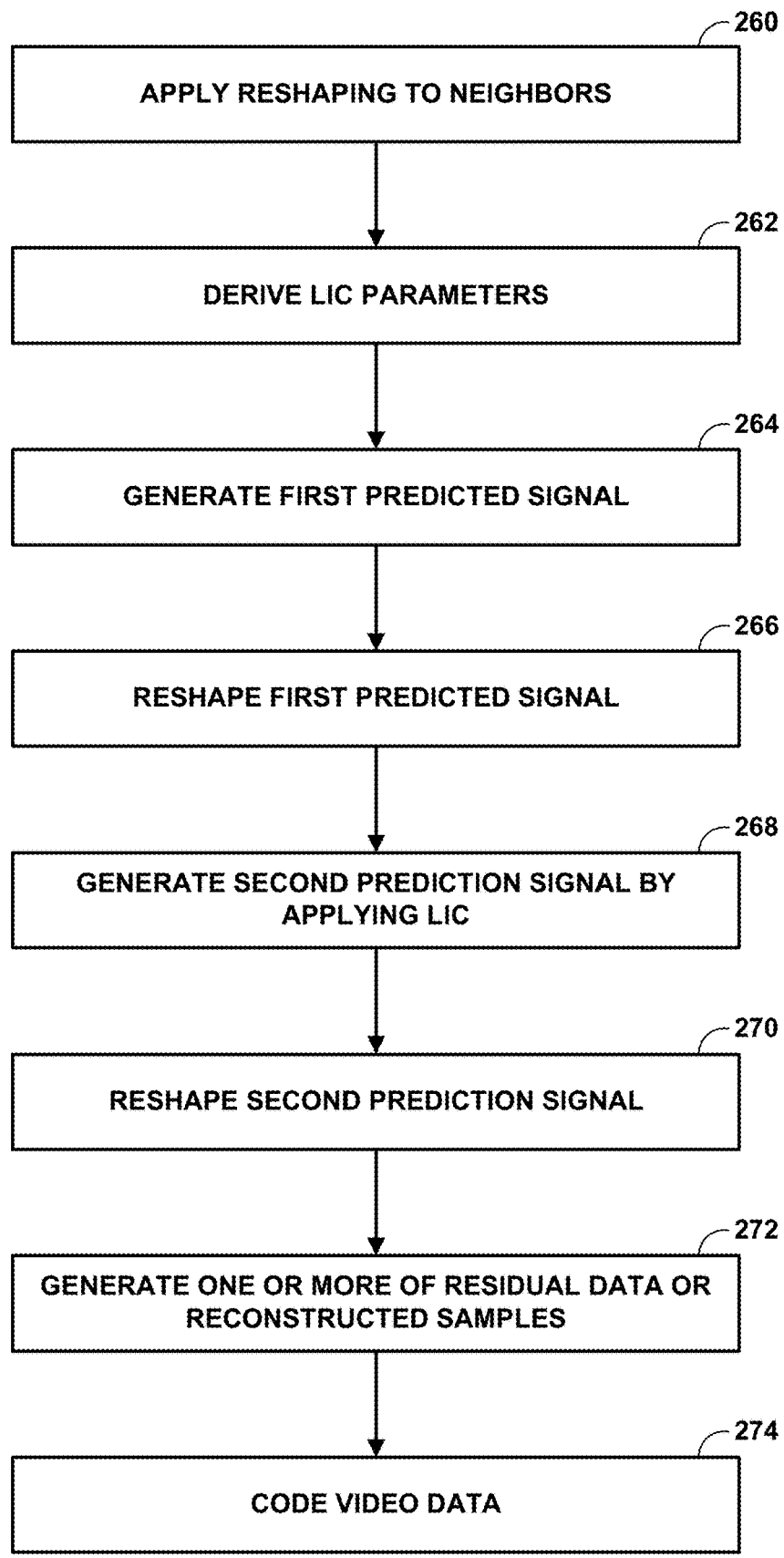
FIG. 23 is a flowchart illustrating example LIC techniques according to the present disclosure.

FIG. 23 is a flowchart illustrating example techniques according to the present disclosure. In some examples, video encoder 200 or video decoder 300 may apply reshaping to neighbor samples (260). For example, video encoder 200 or video decoder 300 may apply forward reshaping to neighbor samples of a reference block to generate reshaped neighbor samples of a reference block. In other examples, video encoder 200 or video decoder 300 may apply inverse reshaping to reconstructed neighbor samples of a current block to generate reshaped reconstructed neighbor samples of the current block. In other examples, video encoder 200 or video decoder 300 do not apply reshaping to neighbors. As mentioned above, reshaping may be used to derive parameters in the same domain for both neighbor samples of the current and reference block. Thus, video encoder 200 or video decoder 300 may apply forward shaping, inverse shaping or no shaping.

Video encoder 200 or video decoder 300 may derive LIC parameters for the current block based on reshaped samples (262). The reshaped samples may include one or more of reshaped reconstructed neighbor samples of the current block, reshaped neighbor samples of the reference block or reshaped samples of the reference block.

Video encoder 200 or video decoder 300 may generate a first predicted signal for the current block (264). In some examples, video encoder 200 or video decoder 300 may reshape the first predicted signal (266). For example, video encoder 200 or video decoder 300 may apply forward reshaping to the first predicted signal. In other, examples video encoder 200 or video decoder 300 may not reshape the first predicted signal. Video encoder 200 or video decoder 300 may use the LIC parameters to generate a second predicted signal by applying LIC to the first predicted signal (reshaped or not reshaped) (268).

In some examples, video encoder 200 or video decoder 300 may reshape the second prediction signal (270). In other examples, video encoder 200 or video decoder 300 may not reshape the second prediction signal. Video encoder 200 or video decoder 300 may generate one or more of residual data based on the second predicted signal or reconstructed samples of the current block based on the second predicted signal (272). Video encoder 200 or video decoder 300 may then code the video data based on one or more of the generated residual data or the reconstructed samples (274). For example, video encoder 200 may transform and quantize the residual data and entropy encode transformed and quantized coefficients, as is discussed with respect to FIG. 27 later in this disclosure. Video decoder 300 may combine residual data with a predicted block to produce a current block, as is discussed with respect to FIG. 28 later in this disclosure.

More specific examples of how to derive LIC parameters, when reshaping is used, are set forth below.

Video encoder 200 or video decoder 300 may apply forward reshaping to the neighbor samples of the reference block before deriving LIC parameters. In this manner, LIC has parameters derived in the reshape domain, but is applied to the non-reshaped samples. Finally, reshaping is applied to the prediction after LIC process (i.e., an LIC predictor). For example, before deriving LIC parameters, video encoder 200 or video decoder 300 may apply forward reshaping to neighbor samples of the reference block to generate the reshaped neighbor samples of the reference block; and prior to generating the residual data or reconstructed samples, reshape the second predicted signal. In this example, video encoder 200 or video decoder 300 may apply LIC to the first predicted signal by applying LIC to the non-reshaped samples of the first predicted signal.

Video encoder 200 or video decoder 300 may apply forward reshaping to the neighbor samples of the reference block before deriving LIC parameters and apply forward reshaping to the samples that are used as input for the LIC process. In this example, LIC has parameters derived in the reshaped domain and is applied to the reshaped inter predicted samples. Later, reshaping is not applied to the LIC predictor, since the reshaping was already considered. For example, before deriving the LIC parameters, video encoder 200 or video decoder 300 may apply forward reshaping to neighbor samples of the reference block to generate the reshaped neighbor samples of the reference block and, before using the LIC parameters to generate the second predicted signal, apply forward reshaping to the first predicted signal.

Video encoder 200 or video decoder 300 may apply inverse reshaping to the reconstructed neighbor samples of the current block. In this case, both current and reference neighbor samples are in the non-reshaped domain. LIC parameters are derived in the non-reshaped domain and LIC is applied to the samples in the non-reshaped domain. Finally, reshaping is applied to the LIC predictor. For example, video encoder 200 or video decoder 300 may apply inverse reshaping to reconstructed neighbor samples of the current block to generate the reshaped reconstructed neighbor samples of the current block and, before generating the residual data or reconstructing the samples of the current block, reshape the second predicted signal. In this example, video encoder 200 or video decoder 300 derive the LIC parameters for the current block by deriving the LIC parameters in a non-reshaped domain and using the LIC parameters to generate the second predicted signal comprises applying LIC to the first predicted signal in the non-reshaped domain.

Video encoder 200 or video decoder 300 may apply inverse reshaping to the reconstructed neighbor samples of the current block. In this case, both current and reference neighbor samples are in the non-reshaped domain. LIC parameters are derived in the non-reshaped domain. Video encoder 200 or video decoder 300 may apply forward reshaping to the samples that are used as input to the LIC process. LIC is applied to the samples in the reshaped domain. Later, reshaping is not applied to the LIC predictor, since the reshaping was already considered. For example, video encoder 200 or video decoder 300 may apply inverse reshaping to the reconstructed neighbor samples of the current block and, before using the LIC parameters to generate the second predicted signal, apply forward reshaping to the first predicted signal. In this example, video encoder 200 or video decoder 300 may derive the LIC parameters for the current block by deriving the LIC parameters in a non-reshaped domain.

The manner in which reshaping is applied for LIC parameter derivation and LIC predictor may be indicated to the decoder side in a bitstream. For example, the manner in which reshaping is applied for LIC parameters derivation and LIC predictor can be signaled in a parameter set, slice header, tile or tile group header, or elsewhere. For example, video encoder 200 may signal the manner in which reshaping is applied for LIC parameter derivation and LIC predictor and video decoder 300 may determine the manner in which reshaping is applied for LIC parameter derivation and LIC predictor by reading the signaling.

The techniques mentioned above may be applied independently or in any combination. Similar techniques may be used in other tools such bilateral filter, Hadamard filter, diffusion filter, and other types of tools.

This disclosure may generally refer to "signaling" certain information, such as syntax elements. The term "signaling" may generally refer to the communication of values, syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 24:
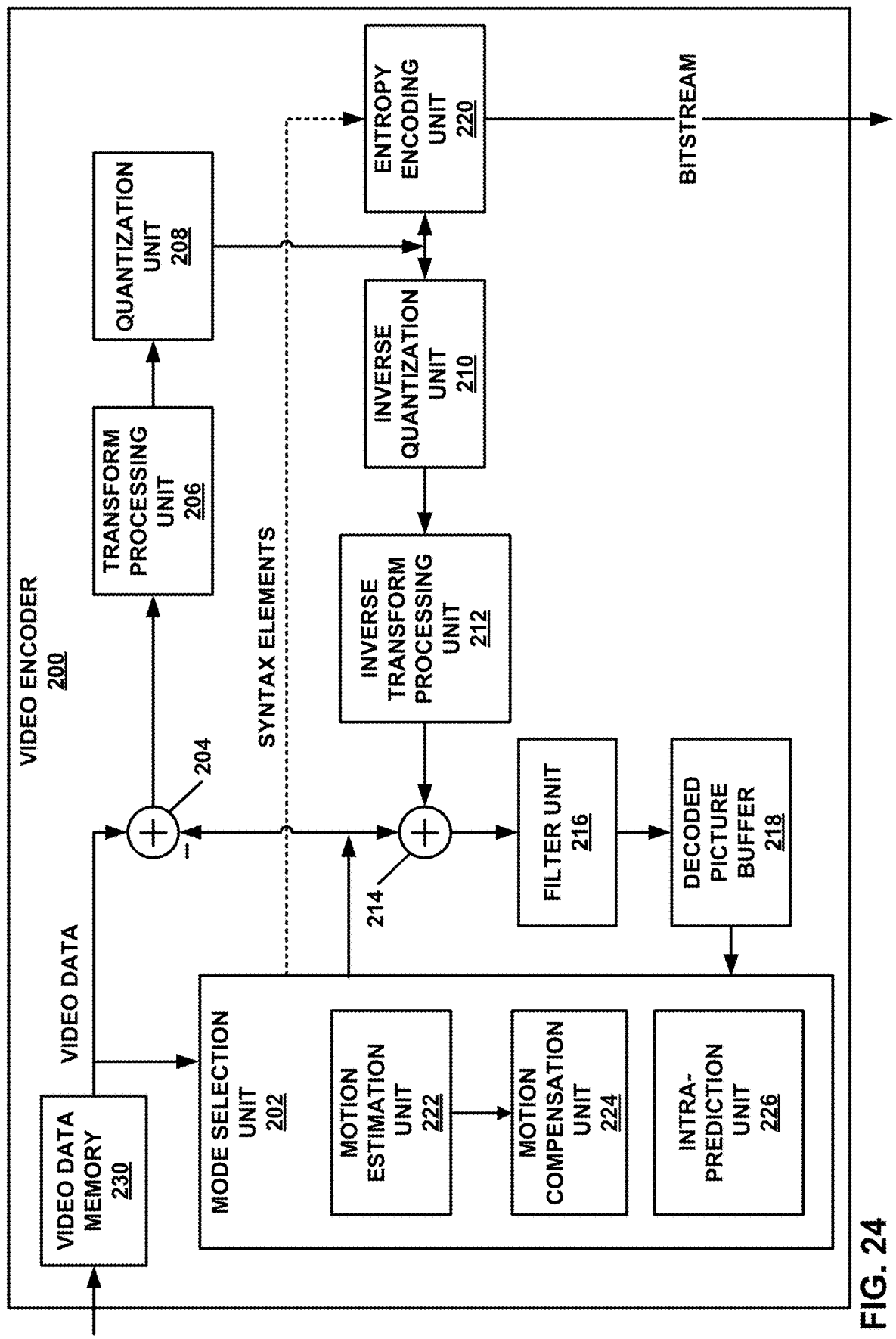
FIG. 24 is a block diagram illustrating an example video encoder that may perform the techniques of this disclosure.

FIG. 24 is a block diagram illustrating an example video encoder 200 that may perform the techniques of this disclosure. FIG. 24 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 24, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 24 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block. Motion estimation unit 222 may form one or more MVs that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging. In some examples, motion compensation unit 224, alone or in combination with filter unit 216, may perform the techniques of this disclosure (such as those of FIG. 21 or 23). For example, motion compensation unit 224, alone or in combination with filter unit 216, may generate filtered samples by performing, in a predicted samples domain, interpolation filtering and a second filtering from a group of one or more of: an adaptive filter, a transform domain filter, a scaler, or a LIC and generate one or more of: residual data based on the filtered samples. In another example, motion compensation unit 224, alone or in combination with filter unit 216, may derive, based on reshaped samples, parameters for a current block. The reshaped samples may include one or more of: reshaped reconstructed neighbor samples of the current block, reshaped neighbor samples of a reference block, or reshaped samples of the reference block. In this example, motion compensation unit 224, alone or in combination with filter unit 216, may generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some examples, the parameters are LIC parameters and the filter is the second filter.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 or video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 or video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 or video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 may calculate sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. In some examples, filter unit 216, alone or in combination with motion compensation unit 224, may perform the techniques of this disclosure (such as those of FIG. 21 or 23). For example, filter unit 216, alone or in combination with motion compensation unit 224, may generate filtered samples by performing, in a predicted samples domain, interpolation filtering and a second filtering from a group of one or more of: an adaptive filter, a transform domain filter, a scaler, or a LIC and generate one or more of: residual data based on the filtered samples. In another example, filter unit 216, alone or in combination with motion compensation unit 224 may derive, based on reshaped samples, parameters for a current block. The reshaped samples may include one or more of: reshaped reconstructed neighbor samples of the current block, reshaped neighbor samples of a reference block, or reshaped samples of the reference block. In this example, filter unit 216, alone or in combination with motion compensation unit 224 may generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some examples, the parameters are LIC parameters and the filter is the second filter.

Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. For example, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify an MV and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processors implemented in circuitry and communicatively coupled to the memory, the one or more processors configured to generate filtered samples by performing, in a predicted samples domain, interpolation filtering and a second filtering from a group of one or more of: an adaptive filter, a transform domain filter, a scaler, or a LIC; generate one or more of: residual data based on the filtered samples, or reconstructed samples based on the filtered samples; and encode the video data based on one or more of the residual data or the reconstructed samples. As used herein, "communicatively coupled" means connected in any manner through which data may be read, written, and/or exchanged.

Video encoder 200 also represents an example of a device configured to encode video data including a memory configured to store video data, and one or more processors implemented in circuitry and communicatively coupled to the memory, the one or more processors configured to derive, based on reshaped samples, parameters for a current block. The reshaped samples may include one or more of:

reshaped reconstructed neighbor samples of the current block, reshaped neighbor samples of a reference block, or reshaped samples of the reference block. In this example, the one or more processors of video encoder 200 may be further configured to generate a first predicted signal for the current block; use the parameters to generate a second predicted signal by applying a filter to the first predicted signal; and perform one or more of: generating residual data based on the second predicted signal, or reconstructing samples of the current block based on the second predicted signal; and encode the video data based on one or more of the residual data or the reconstructed samples.

Figure 26:
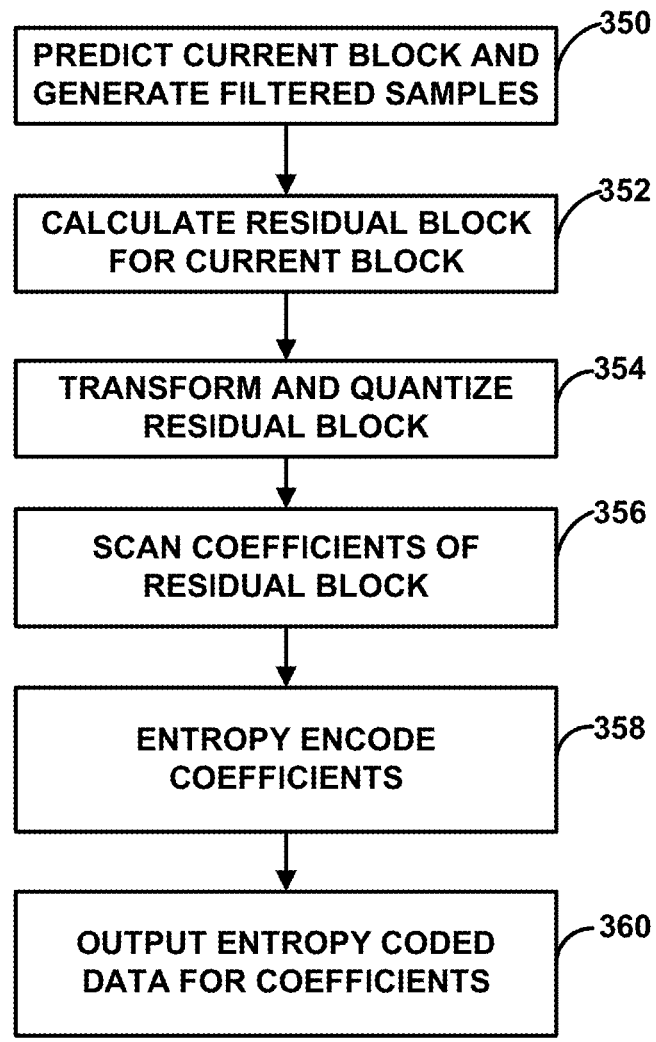
FIG. 26 is a flowchart illustrating an example method for encoding a current block of video data.

FIG. 26 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 26, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 26 are illustrated to assist with understanding the operations performed by video decoder 300. The units may be implemented as fixed-function circuits, programmable circuits, or a combination thereof. Similar to FIG. 24, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Figure 25:
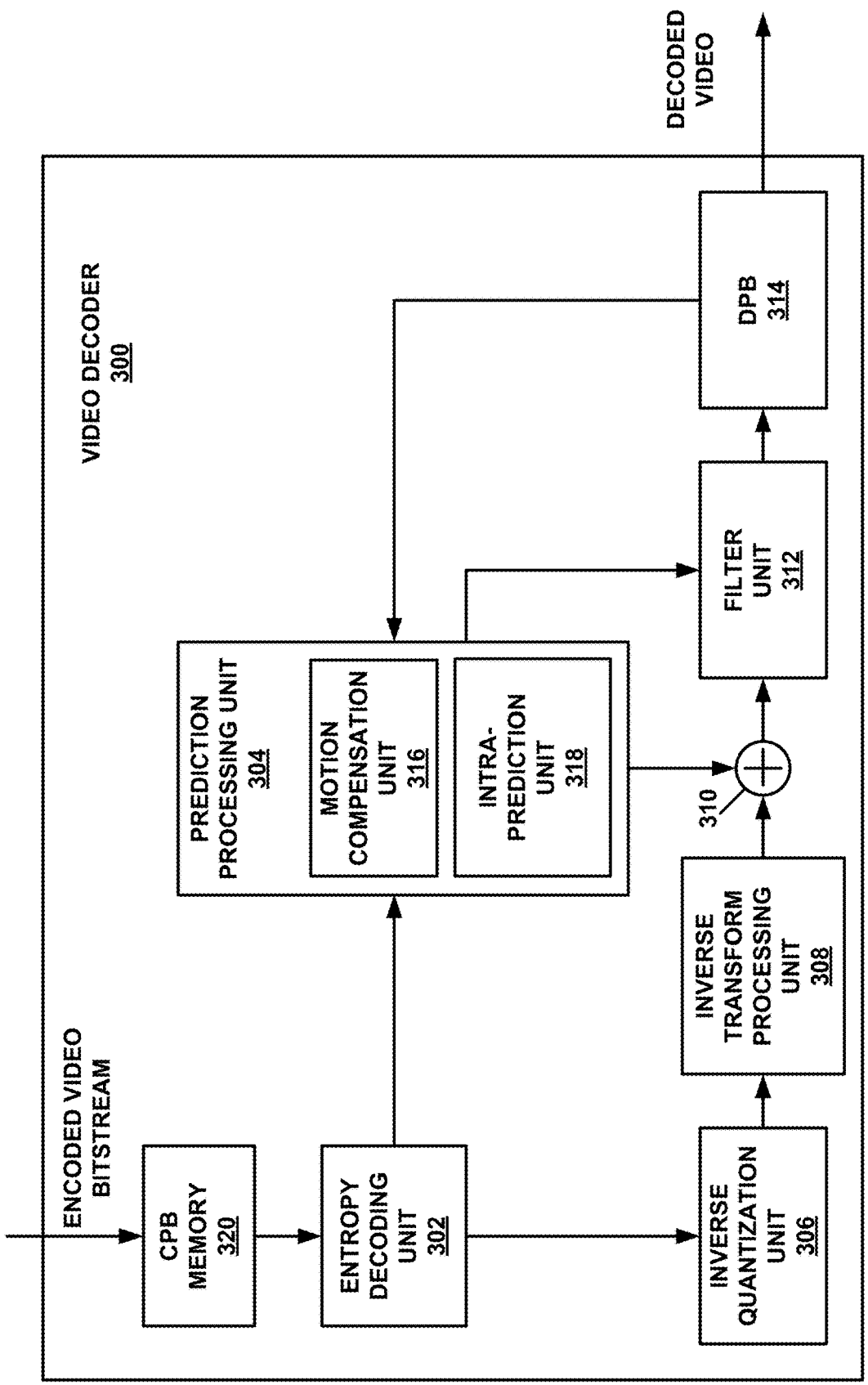
FIG. 25 is a block diagram illustrating an example video decoder that may perform the techniques of this disclosure.

Furthermore, prediction processing unit 304 generates a prediction block according to prediction information syntax elements, including prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 25). In some examples, motion compensation unit 316, alone or in combination with filter unit 312, may perform the techniques of the present disclosure (such as those of FIG. 21 or 23). For example, motion compensation unit 316, alone or in combination with filter unit 312, may generate filtered samples by performing, in a predicted samples domain, interpolation filtering and a second filtering from a group of one or more of: an adaptive filter, a transform domain filter, a scaler, or a LIC and generate one or more of: residual data based on the filtered samples. In another example, motion compensation unit 316, alone or in combination with filter unit 312, may derive, based on reshaped samples, parameters for a current block. The reshaped samples may include one or more of: reshaped reconstructed neighbor samples of the current block, reshaped neighbor samples of a reference block, or reshaped samples of the reference block. In this example, motion compensation unit 316, alone or in combination with filter unit 312, may generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some example, the parameters are LIC parameters and the filter is the second filter.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 25). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. In some examples, filter unit 312, alone or in combination with motion compensation unit 316, may also perform the techniques of the present disclosure (such as those of FIG. 21 or 23). For example, filter unit 312, alone or in combination with motion compensation unit 316, may generate filtered samples by performing, in a predicted samples domain, interpolation filtering and a second filtering from a group of one or more of: an adaptive filter, a transform domain filter, a scaler, or a LIC and generate one or more of: residual data based on the filtered samples. In another example, filter unit 312, alone or in combination with motion compensation unit 316, may derive, based on reshaped samples, parameters for a current block. The reshaped samples may include one or more of: reshaped reconstructed neighbor samples of the current block, reshaped neighbor samples of a reference block, or reshaped samples of the reference block. In this example, filter unit 312, alone or in combination with motion compensation unit 316, may generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some examples, the parameters are LIC parameters and the filter is the second filter. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processors implemented in circuitry and communicatively coupled to the memory, the one or more processors configured to generate filtered samples by performing, in a predicted samples domain, interpolation filtering and a second filtering from a group of one or more of: an adaptive filter, a transform domain filter, a scaler, or a LIC; generate one or more of: residual data based on the filtered samples, or reconstructed samples based on the filtered samples; and decode the video data based on one or more of the residual data or the reconstructed samples.

Video decoder 300 also represents an example of a video decoding device including a memory configured to store video data, and one or more processors implemented in circuitry and communicatively coupled to the memory, the one or more processors configured to derive, based on reshaped samples, parameters for a current block. The reshaped samples may include one or more of: reshaped reconstructed neighbor samples of the current block, reshaped neighbor samples of a reference block, or reshaped samples of the reference block. In this example, the one or more processors of video decoder 300 may be further configured to generate a first predicted signal for the current block; use the parameters to generate a second predicted signal by applying a filter to the first predicted signal; and perform one or more of: generating residual data based on the second predicted signal, or reconstructing samples of the current block based on the second predicted signal; and code the video data based on one or more of the residual data or the reconstructed samples. In some examples, the parameters are LIC parameters and the filter is the second filter.

FIG. 26 is a flowchart illustrating an example method for encoding a current block. The current block may comprise a current CU. Although described with respect to video encoder 200 (FIGS. 1 and 24), it should be understood that other devices may be configured to perform a method similar to that of FIG. 26.

In this example, video encoder 200 may initially predict the current block and generate filtered samples (350). For example, video encoder 200 may form a prediction block for the current block. In some examples, video encoder 200 may perform the techniques of this disclosure (such as those of FIG. 21 or 23) as part of applying performing inter prediction for the current block. For example, video encoder 200 may generate filtered samples by performing, in a predicted samples domain, interpolation filtering and a second filtering from a group of one or more of: an adaptive filter, a transform domain filter, a scaler, or a LIC and generate one or more of: residual data based on the filtered samples. In another example, video encoder 200 may derive, based on reshaped samples, parameters for a current block. The reshaped samples may include one or more of: reshaped reconstructed neighbor samples of the current block, reshaped neighbor samples of a reference block, or reshaped samples of the reference block. In this example, video encoder 200 may generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some examples, the parameters are LIC parameters and the filter is the second filter.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 27:
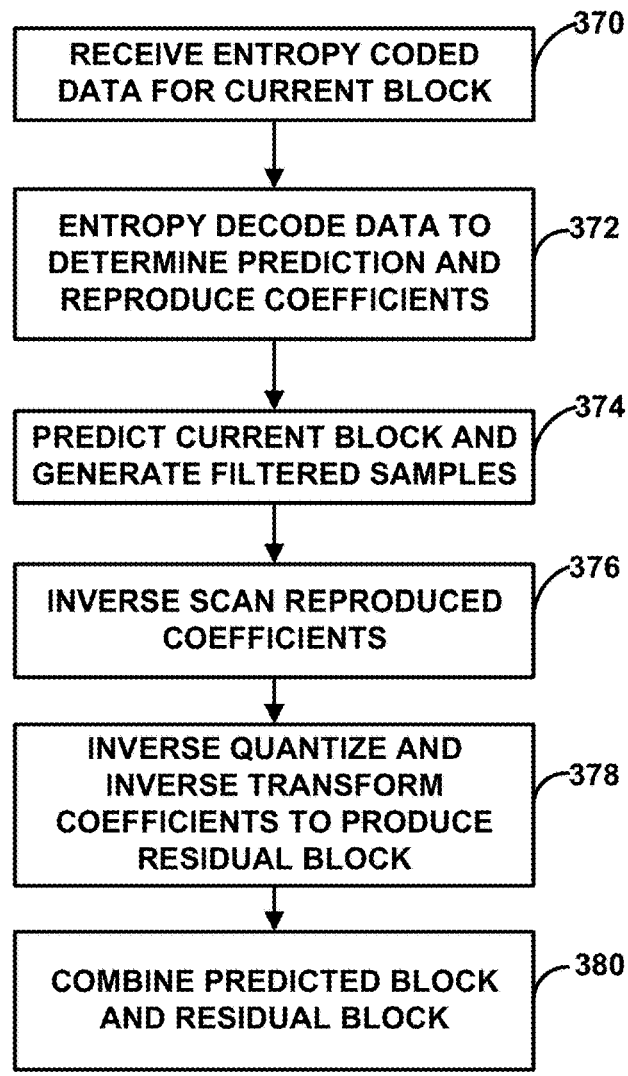
FIG. 27 is a flowchart illustrating an example method for decoding a current block of video data.

FIG. 27 is a flowchart illustrating an example method for decoding a current block of video data. The current block may comprise a current CU. Although described with respect to video decoder 300 (FIGS. 1 and 25), it should be understood that other devices may be configured to perform a method similar to that of FIG. 27.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block and generate filtered samples (374), e.g., using an intra- or inter-prediction mode as indicated by the prediction information for the current block, to calculate a prediction block for the current block. In some examples, video decoder 300 may perform the techniques of this disclosure (such as those of FIG. 21 or 23) as part of applying performing inter prediction for the current block. For example, video decoder 300 may generate filtered samples by performing, in a predicted samples domain, interpolation filtering and a second filtering from a group of one or more of: an adaptive filter, a transform domain filter, a scaler, or a LIC; generate one or more of: residual data based on the filtered samples, or reconstructed samples based on the filtered samples; and decode the video data based on one or more of the residual data or the reconstructed samples. In another example, video decoder 300 may derive, based on reshaped samples, parameters for a current block. The reshaped samples may include one or more of: reshaped reconstructed neighbor samples of the current block, reshaped neighbor samples of a reference block, or reshaped samples of the reference block. In this example, video decoder 300 may be further configured to generate a first predicted signal for the current block; use the parameters to generate a second predicted signal by applying a filter to the first predicted signal; and perform one or more of: generating residual data based on the second predicted signal, or reconstructing samples of the current block based on the second predicted signal. In some examples the parameters are LIC parameters and the filter is the second filter.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

The techniques of this disclosure include the following examples.

Example 1A. A method of coding video data, the method comprising: generating filtered samples by performing, in a predicted samples domain, interpolation filtering and a second filter from a group of one or more of: a bilateral filter (BIF), Uniform Directional Diffusion Filters (UDDF), Hadamard Domain Transform Filter (HTDF), reshaper, or local illumination compensation (LIC); and one or more of: generating residual data based on the filtered samples, or reconstructing samples based on the filtered samples.

Example 2A. The method of example 1A, wherein generating the filtered samples comprises: generating the filtered samples by applying, to an input signal, a filter implemented by convolving a result of convolving the input signal with a first finite impulse response (FIR) filter with a second FIR filter, the first FIR filter providing motion compensated prediction, the second FIR filter being the second filter.

Example 3A. The method of example 1A, wherein generating the filtered samples comprises: generating the filtered samples by applying, to an input signal, a filter implemented by convolving a result of convolving the input signal with a first finite impulse response (FIR) filter with a second FIR filter, the second FIR filter providing motion compensated prediction, the first FIR filter being the second filter.

Example 4A. The method of example 1A, wherein generating the filtered samples comprises: generating the filtered samples by applying a filter defined by: $y(n)=x(n) \otimes (h1(n) \otimes h2(n))=x(n) \otimes h12(n)$, where $y(n)$ is the filtered samples, $x(n)$ is a 1-dimensional (1D) input signal, h1 is an interpolation filter, h2 is the second filter, and h12 is a convolution of h1 and h2.

Example 5A. The method of example 1A, wherein generating the filtered samples comprises: generating the filtered samples by applying a filter defined by: $y(n)=x(n) \otimes (h1(n) \otimes h2(n))=x(n) \otimes h12(n)$, where $y(n)$ is the filtered samples, $x(n)$ is a 1-dimensional (1D) input signal, h1 is the second filter, h2 is an interpolation filter, and h12 is a convolution of h1 and h2.

Example 6A. The method of any of examples 1A-5A, wherein generating the filtered samples comprises cascading or combining the interpolation filter with the second filter, the second filter being an adaptive filter or scaling process, the adaptive filter or scaling process being one of BIF, UDDF, HTDF, or LIC.

Example 7A. The method of any of examples 1A-6A, further comprising: determining a candidate filters set; and determining an index that indicates the second filter within the candidate filters set.

Example 8A. The method of example 7A, wherein determining the index comprises determining the index based on local signal statistics.

Example 9A. The method of example 7A, wherein one or more syntax elements explicitly signal the index.

Example 10A. The method of any of examples 1A-8A, wherein generating the filtered samples comprises performing the interpolation filtering and filtering with the second filter in a single processing stage.

Example 1B. A method of coding video data, the method comprising: deriving, based on reshaped samples, local illumination compensation (LIC) parameters for a current block, the reshaped samples including one or more of: reshaped reconstructed neighbor samples of the current block, reshaped neighbor samples of a reference block, or reshaped samples of the reference block; generating a first predicted signal for the current block; using the LIC parameters to generate a second predicted signal by applying LIC to the first predicted signal; and performing one or more of: generating residual data based on the second predicted signal, or reconstructing samples of the current block based on the second predicted signal.

Example 2B. The method of example 1B, wherein: the method further comprises, before deriving the LIC parameters, applying forward reshaping to neighbor samples of the reference block to generate the reshaped neighbor samples of the reference block, applying LIC to the first predicted signal comprises applying LIC to the non-reshaped samples of the first predicted signal, and the method further comprises, prior to generating the residual data or reconstructed samples, reshaping the second predicted signal.

Example 3B. The method of example 1B, wherein the method further comprises: before deriving the LIC parameters, applying forward reshaping to neighbor samples of the reference block to generate the reshaped neighbor samples of the reference block, and before using the LIC parameters to generate the second predicted signal, applying forward reshaping to the first predicted signal.

Example 4B. The method of example 1B, wherein: the method further comprises applying inverse reshaping to reconstructed neighbor samples of the current block to generate the reshaped reconstructed neighbor samples of the current block, deriving the LIC parameters for the current block comprises deriving the LIC parameters in a non-reshaped domain, using the LIC parameters to generate the second predicted signal comprises applying LIC to the first predicted signal in the non-reshaped domain, and the method further comprises, before generating the residual data or reconstructing the samples of the current block, reshaping the second predicted signal.

Example 5B. The method of example 1B, wherein: the method further comprises applying inverse reshaping to the reconstructed neighbor samples of the current block, deriving the LIC parameters for the current block comprises deriving the LIC parameters in a non-reshaped domain, and the method further comprises, before using the LIC parameters to generate the second predicted signal, applying forward reshaping to the first predicted signal.

Example 6B. The method of any of examples 1B-5B, further comprising the method of any of examples 1A-6A.

Example 1C. The method of any of examples 1A-6B, wherein coding comprises decoding.

Example 2C. The method of any of examples 1A-6B, wherein coding comprises encoding.

Example 3C. A device for coding video data, the device comprising one or more means for performing the method of any of examples 1A-6B.

Example 4C. The device of example 3C, wherein the one or more means comprise one or more processors implemented in circuitry.

Example 5C. The device of any of examples 3C and 4C, further comprising a memory to store the video data.

Example 6C. The device of any of examples 3C-5C, further comprising a display configured to display decoded video data.

Example 7C. The device of any of examples 3C-6C, wherein the device comprises one or more of a camera, a computer, a mobile device, a broadcast receiver device, or a set-top box.

Example 8C. The device of any of examples 3C-7C, wherein the device comprises a video decoder.

Example 9C. The device of any of examples 3C-8C, wherein the device comprises a video encoder.

Example 10C. A computer-readable storage medium having stored thereon instructions that, when executed, cause one or more processors to perform the method of any of examples 1A-6B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
deriving, based on neighbor samples, filter parameters for a second filter, wherein the neighbor samples comprise neighbor samples of a current block of the video data or neighbor samples of a reference block of the video data and wherein the second filter comprises one or more of a bilateral filter (BIF) or a Hadamard Domain Transform Filter (HTDF);
generating predicted samples by applying, in a predicted samples domain, a first filter, the first filter comprising an interpolation filter, and the second filter to samples of the current block, the second filter corresponding to the filter parameters;
generating one or more of:
residual data based on the predicted samples, or
reconstructed samples based on the predicted samples; and
coding the video data based on one or more of the residual data or the reconstructed samples.

2. The method of claim 1, wherein generating the predicted samples comprises:
generating the predicted samples by applying, to an input signal, a filter implemented by convolving a result of convolving the input signal with a first finite impulse response (FIR) filter and a second FIR filter, the first FIR filter providing motion compensated prediction, wherein the second filter comprises the second FIR filter.

3. The method of claim 1, wherein generating the predicted samples comprises:
generating the predicted samples by applying, to an input signal, a filter implemented by convolving a result of convolving the input signal with a first finite impulse response (FIR) filter and a second FIR filter, the second FIR filter providing motion compensated prediction, wherein the second filter comprises the first FIR filter.

4. The method of claim 1, wherein generating the predicted samples comprises:
generating the predicted samples by applying a filter defined by:

$$y(n)=x(n)\otimes(h_1(n)\otimes h_2(n))=x(n)\otimes h_{12}(n)$$

where y(n) is the predicted samples, x(n) is a 1-dimensional (1D) input signal, $\otimes$ is a convolution process, $h_1$ is an interpolation filter, $h_2$ is the second filter, and $h_{12}$ is a convolution of $h_1$ and $h_2$.

5. The method of claim 1, wherein generating the predicted samples comprises:
generating the predicted samples by applying a filter defined by:

$$y(n)=x(n)\otimes(h_1(n)\otimes h_2(n))=x(n)\otimes h_{12}(n)$$

where y(n) is the predicted samples, x(n) is a 1-dimensional (1D) input signal, $\otimes$ is a convolution process, $h_1$ is the second filter, $h_2$ is an interpolation filter, and $h_{12}$ is a convolution of $h_1$ and $h_2$.

6. The method of claim 1, wherein generating the predicted samples comprises cascading or combining the interpolation filter with the second filter.

7. The method of claim 1, further comprising:
determining a candidate filter set; and
determining an index that indicates the second filter within the candidate filter set.

8. The method of claim 7, wherein determining the index comprises determining the index based on local signal statistics.

9. The method of claim 7, wherein one or more syntax elements explicitly signal the index in a bitstream.

10. The method of claim 1, wherein coding the video data comprises coding the video data in an inter mode, wherein the neighbor samples comprise reshaped neighbor samples, and wherein generating the predicted samples comprises:
generating a first predicted signal for the current block by applying the first filter to the samples of the current block; and
generating a second predicted signal by applying the second filter to the first predicted signal.

11. The method of claim 10, further comprising:
before deriving the filter parameters, applying forward reshaping to the neighbor samples to generate the reshaped neighbor samples; and
prior to generating the residual data or the reconstructed samples, reshaping the second predicted signal,
wherein applying the second filter to the first predicted signal comprises applying the second filter to the non-reshaped samples of the first predicted signal.

12. The method of claim 10, further comprising:
before deriving the filter parameters, applying forward reshaping to the neighbor samples of the reference block to generate the reshaped neighbor samples of the reference block; and
before generating the second predicted signal, applying forward reshaping to the first predicted signal.

13. The method of claim 10, further comprising:
applying inverse reshaping to reconstructed neighbor samples of the current block to generate reshaped reconstructed neighbor samples of the current block; and
before generating the residual data or reconstructing the samples of the current block, reshaping the second predicted signal,
wherein deriving the filter parameters for the second filter comprises deriving the filter parameters in a non-reshaped domain and generating the second predicted signal comprises applying the second filter to the first predicted signal in the non-reshaped domain.

14. A device for coding video data, the device comprising:
a memory configured to store video data; and
one or more processors implemented in circuitry and communicatively coupled to the memory, the one or more processors configured to:
derive, based on neighbor samples, filter parameters for a second filter, wherein the neighbor samples comprise neighbor samples of a current block of the video data or neighbor samples of a reference block of the video data and wherein the second filter comprises one or more of a bilateral filter (BIF) or a Hadamard Domain Transform Filter (HTDF);
generate predicted samples by applying, in a predicted samples domain, a first filter, the first filter comprising an interpolation filter, and the second filter to samples of the current block, the second filter corresponding to the filter parameters;
generate one or more of:
residual data based on the predicted samples, or reconstructed samples based on the predicted samples; and
code the video data based on one or more of the residual data or the reconstructed samples.

15. The device of claim 14, wherein the one or more processors are configured to generate the predicted samples by:
applying, to an input signal, a filter implemented by convolving a result of convolving the input signal with a first FIR filter and a second FIR filter, the first FIR filter providing motion compensated prediction, wherein the second filter comprises the second FIR filter.

16. The device of claim 14, wherein the one or more processors are configured to generate the predicted samples by:
applying, to an input signal, a filter implemented by convolving a result of convolving the input signal with a first FIR filter and a second FIR filter, the second FIR filter providing motion compensated prediction, wherein the second filter comprises the first FIR filter.

17. The device of claim 14, wherein the one or more processors are configured to generate the predicted samples by:
applying a filter defined by:

$$y(n)=x(n)\otimes(h_1(n)\otimes h_2(n))=x(n)\otimes h_{12}(n)$$

where y(n) is the predicted samples, x(n) is a 1-dimensional (1D) input signal, $\otimes$ is a convolution process, $h_1$ is an interpolation filter, $h_2$ is the second filter, and $h_{12}$ is a convolution of $h_1$ and $h_2$.

18. The device of claim 14, wherein the one or more processors are configured to generate the predicted samples by:
applying a filter defined by:

$$y(n)=x(n)\otimes(h_1(n)\otimes h_2(n))=x(n)\otimes h_{12}(n)$$

where y(n) is the predicted samples, x(n) is a 1-dimensional (1D) input signal, $\otimes$ is a convolution process, $h_1$ is the second filter, $h_2$ is an interpolation filter, and $h_{12}$ is a convolution of $h_1$ and $h_2$.

19. The device of claim 14, wherein the one or more processors are configured to generate the predicted samples by: cascading or combining the interpolation filtering with the second filter.

20. The device of claim 14, wherein the one or more processors are further configured to:
determine a candidate filters set; and
determine an index that indicates the second filter within the candidate filters set.

21. The device of claim 20, wherein the one or more processors are configured to determine the index based on local signal statistics.

22. The device of claim 20, wherein one or more syntax elements explicitly signal the index in a bitstream.

23. The device of claim 14, wherein coding the video data comprises coding the video data in an inter mode, wherein the neighbor samples comprise reshaped neighbor samples and wherein as part of generating the predicted samples, the one or more processors are configured to:
generate a first predicted signal for the current block by applying the first filter to the samples of the current block; and
generate a second predicted signal by applying the second filter to the first predicted signal.

24. The device of claim 22, wherein the one or more processors are further configured to:
apply forward reshaping to the neighbor samples, before deriving the filter parameters, to generate the reshaped neighbor samples; and
reshape the second predicted signal, prior to generating the residual data or the reconstructed samples,
wherein the one or more processors apply the second filter to the first predicted signal by applying the second filter to the non-reshaped samples of the first predicted signal.

25. The device of claim 22, wherein the one or more processors are further configured to:
apply forward reshaping to the neighbor samples of the reference block, before deriving the filter parameters, to generate the reshaped neighbor samples of the reference block; and
apply forward reshaping to the first predicted signal before using the parameters to generate the second predicted signal.

26. The device of claim 22, wherein the one or more processors are further configured to:
apply inverse reshaping to reconstructed neighbor samples of the current block to generate the reshaped reconstructed neighbor samples of the current block; and
reshape the second predicted signal before generating the residual data or reconstructing the samples of the current block, wherein the one or more processors derive the filter parameters for the second filter in a non-reshaped domain and wherein the one or more processors use the filter parameters to generate the second predicted signal by applying the second filter to the first predicted signal in the non-reshaped domain.

27. A non-transitory computer-readable medium having stored thereon instructions that, when executed, cause one or more processors to:
derive, based on neighbor samples, filter parameters for a second filter, wherein the neighbor samples comprise neighbor samples of a current block of the video data or neighbor samples of a reference block of the video data and wherein the second filter comprises one or more of a bilateral filter (BIF) or a Hadamard Domain Transform Filter (HTDF);
generate predicted samples by applying, in a predicted samples domain, a first filter, the first filter comprising an interpolation filter, and the second filter to samples of the current block, the second filter corresponding to the filter parameters;
generate one or more of:
residual data based on the predicted samples, or
reconstructed samples based on the predicted samples; and
code the video data using an inter mode based on one or more of the residual data or the reconstructed samples.

* * * * *